(12) United States Patent
Whear et al.

(10) Patent No.: US 11,183,738 B2
(45) Date of Patent: Nov. 23, 2021

(54) LEAD ACID BATTERY SEPARATORS, BATTERIES AND RELATED METHODS

(71) Applicant: Daramic, LLC, Charlotte, NC (US)

(72) Inventors: J. Kevin Whear, Utica, KY (US); Eric H. Miller, Philpot, KY (US); Margaret R. Roberts, Owensboro, KY (US)

(73) Assignee: Daramic, LLC, Charlotte, NC (US)

( * ) Notice: Subject to any disclaimer, the term of this patent is extended or adjusted under 35 U.S.C. 154(b) by 306 days.

(21) Appl. No.: 15/624,948

(22) Filed: Jun. 16, 2017

(65) Prior Publication Data

US 2017/0288277 A1    Oct. 5, 2017

Related U.S. Application Data

(62) Division of application No. 13/239,987, filed on Sep. 22, 2011.

(Continued)

(51) Int. Cl.
*H01M 10/06* (2006.01)
*H01M 50/463* (2021.01)
(Continued)

(52) U.S. Cl.
CPC ......... *H01M 50/463* (2021.01); *H01M 10/06* (2013.01); *H01M 10/52* (2013.01);
(Continued)

(58) Field of Classification Search
CPC ...... H01M 10/06; H01M 10/52; H01M 2/145; H01M 2/16; H01M 2/18
See application file for complete search history.

(56) References Cited

U.S. PATENT DOCUMENTS

| | | |
|---|---|---|
| 631,810 A | 8/1899 | Osburn |
| 1,529,839 A | 3/1925 | Lunn |

(Continued)

FOREIGN PATENT DOCUMENTS

| | | |
|---|---|---|
| WO | WO 94/20995 | 9/1994 |
| WO | WO 2011/049852 A1 | 4/2011 |

OTHER PUBLICATIONS

U.S. Appl. No. 61/253,096, filed Oct. 20, 2009, Miller et al.

(Continued)

*Primary Examiner* — Sarah A. Slifka
*Assistant Examiner* — Brent C Thomas
(74) *Attorney, Agent, or Firm* — Hammer & Associates, P.C.

(57) ABSTRACT

In accordance with at least selected embodiments or aspects, the present invention is directed to improved, unique, and/or complex performance lead acid battery separators, such as improved flooded lead acid battery separators, batteries including such separators, methods of production, and/or methods of use. The preferred battery separator of the present invention addresses and optimizes multiple separator properties simultaneously. It is believed that the present invention is the first to recognize the need to address multiple separator properties simultaneously, the first to choose particular multiple separator property combinations, and the first to produce commercially viable multiple property battery separators, especially such a separator having negative cross ribs.

35 Claims, 33 Drawing Sheets

Related U.S. Application Data

(60) Provisional application No. 61/385,253, filed on Sep. 22, 2010, provisional application No. 61/532,598, filed on Sep. 9, 2011.

(51) Int. Cl.
  *H01M 10/52* (2006.01)
  *H01M 50/403* (2021.01)
  *H01M 50/409* (2021.01)

(52) U.S. Cl.
  CPC ........ *H01M 50/403* (2021.01); *H01M 50/409* (2021.01); *Y02T 10/70* (2013.01)

(56) References Cited

U.S. PATENT DOCUMENTS

| | | | |
|---|---|---|---|
| 3,351,495 A | | 11/1967 | Larsen |
| 3,847,676 A | * | 11/1974 | Palmer .................... D04H 3/16 264/115 |
| 4,664,992 A | | 5/1987 | Edwards et al. |
| 4,745,134 A | * | 5/1988 | Osei-Gyimah .......... B01J 47/04 428/402 |
| 4,927,722 A | | 5/1990 | Bohnstedt et al. |
| 6,120,939 A | * | 9/2000 | Whear .................. D04H 1/4291 429/143 |
| 6,492,059 B1 | * | 12/2002 | Hottori ............... H01M 2/1606 429/136 |
| 2002/0004166 A1 | * | 1/2002 | Weerts .................... H01M 2/18 429/143 |
| 2002/0106557 A1 | | 8/2002 | Fraser-Bell et al. |
| 2003/0054233 A1 | | 3/2003 | Zucker |
| 2009/0017385 A1 | * | 1/2009 | Harada ............... H01M 2/1613 429/255 |
| 2011/0045339 A1 | * | 2/2011 | La ........................ H01M 10/14 429/163 |
| 2011/0091761 A1 | | 4/2011 | Miller et al. |
| 2011/0287324 A1 | * | 11/2011 | Rajaram ................. C03C 13/00 429/246 |

OTHER PUBLICATIONS

K. Ihmels et al., "Chapter 7, Separator Materials for Valve-Regulated Lead-Acid Batteries," Elsevier B.V., 2004, D.A.J. Rand et al. editors, pp. 183-205.

Jorg Deiters et al., "A New Polyethylene Separator for Heavy-Duty Traction Batteries," Journal of Power Sources 158 (2006), Elsevier B.V., pp. 1069-1072.

M.L. Sorita et al., "Development of High Power VRLA Batteries Using Novel Materials and Processes," Journal of Power Sources 5111 (2002), Elsevier B.V., pp. 1-12.

M. Perrin et al., "Effect of Compression on the Behaviour of Lead-Acid Batteries," Journal of Power Sources 4071 (2000), Elsevier B.V., pp. 1-12.

M. Perrin et al., "Extending Cycle Life of Lead Acid Batteries: A New Separation System Allows the Application of Pressure on the Plate Group," Journal of Power Sources, vol. 105, Issue 2, Elsevier B.V., (p. 114-119), (Mar. 20, 2002).

Concordia University, "Environmental Health and Safety: Lead Acid Batteries", pp. 1-18 (Dec. 2016).

Trojan Battery Company, "Effects of Impurities on Lead-Acid Batteries", White Paper (2019) pp. 1-2.

* cited by examiner

Battery Functionality

- Starting, Lighting and Ignition (SLI)
  - Cold Start – High Power
  - Emergency Lighting – Infrequent, Shallow Discharge
  - Normal State of Charge: 100%

- Traction (Motive) Power
  - Long Duration Cycling – Regular, Deep Discharge
  - Normal State of Charge: 20 to 100%

- Micro Hybrid
  - Cold Start – High Power
  - Regenerative Braking – Charge Acceptance
  - Multiple Hot Starts – Moderate Power
  - Electric Load w/ no IC – Frequent Moderate Cycling
  - Normal State of Charge: 40 to 80%

Fig. 2

Micro-Hybrid: Flooded versus VRLA

| Characteristic | Flooded | Valve Regulated |
|---|---|---|
| Power Delivery (Restart) | + | ++ |
| Charge Acceptance (Braking) | + | ++ |
| Cycling (Battery Life) | + | ++ |
| Heat Resistance (Engine Compartment) | +++ | + |
| Safety | +++ | + |
| Cost | ~€ 125 / battery | ~€ 300 / Battery |

Fig. 3

W. Boehnstedt, et al, US Patent 6,124,059 (1998)

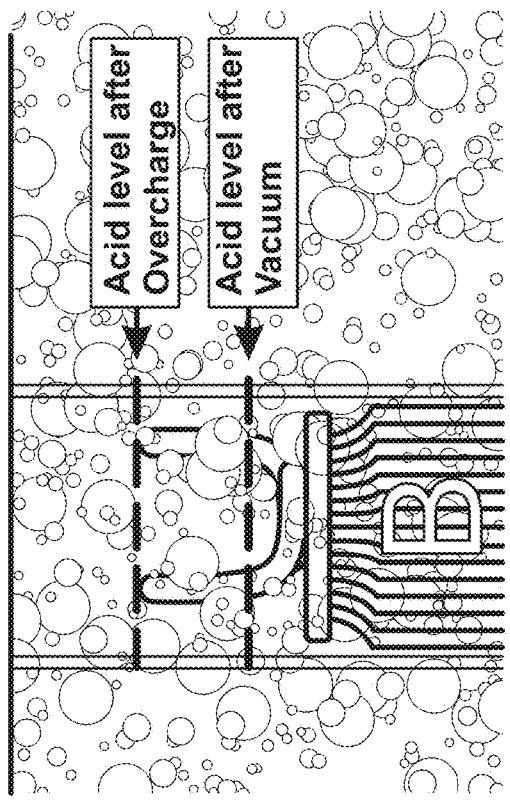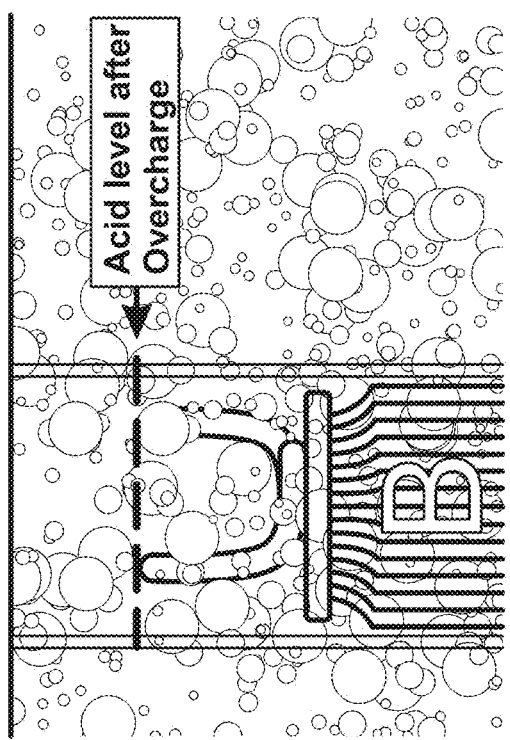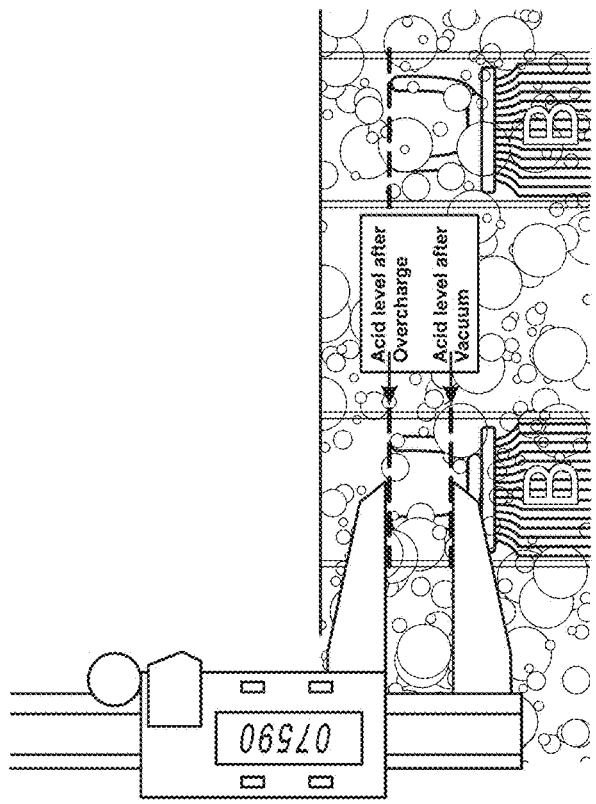
Fig. 9

Improving Functional ER

| Description | Height Change after gas evacuation (mm) | Est. Gas Volume (cc) |
|---|---|---|
| Cell with no separator (glass rods) | 6.9 | 52.3 |
| Cell with standard separator | 15.6 | 118.0 |
| Standard separator (Minus Plate) | | 65.7 |
| Cell with no separator (glass rods) | 6.9 | 52.3 |
| Cell with DuraLife® separator | 11.6 | 87.8 |
| DuraLife® separator (Minus Plate) | | 35.5 |

Gas entrapped on the plates → 52.3

46% Reduction in Entrapped Gas on Separator

Fig. 10

Charge Acceptance / Power Delivery

- Lowering Separator Electrical Resistance
  - ◆ Apply Negative Cross Rib (~ 20% Reduction)
  - ◆ Increasing Separator Porosity (~ 50% Reduction)
- Reduce Functional Separator Electrical Resistance
  - ◆ Minimize Entrapped Gas (~40% Reduction)
- Increasing Available Electrolyte

Fig. 11

Cycle-Ability

Prevent Shedding of Positive Active Material (PAM)

- Increase Number of Ribs -> Increase Contact Points
- Separator Laminate (e.g. glass-mat)
  - Increase Gas Entrapment

Fig. 12

Laminate Gas Entrapment

| Description | Height Change after gas evacuation (mm) | Estimated Gas Volume (cc) | | Estimated Gas Volume (cc) |
|---|---|---|---|---|
| Cell with no separator (glass rods) | 5.55 | 42.0 | Plate | 42.0 |
| Cell with separator | 9.31 | 70.6 | Separator | 28.5 |
| Cell w/ separator and laminate A | 14.06 | 106.6 | Laminate A | 36.0 |
| Cell w/ separator and laminate B | 10.59 | 80.3 | Laminate B | 9.7 |
| Cell w/ separator and laminate C | 9.87 | 74.8 | Laminate C | 4.2 |

Fig. 13

Modified Micro-Hybrid Separator

- Micro-Hybrid -> Best Value Proposition
  - ◆ Enhanced Flooded Battery -> Preferred Value
- Charge Acceptance / Power Delivery
  - ◆ Lower Electrical Resistance -> Negative Cross Rib
  - ◆ Lower Electrical Resistance -> Higher Porosity
  - ◆ Minimize Gas -> DuraLife® Separator
- Cycle-Ability
  - ◆ Increase Number of Ribs -> Active Material Support
  - ◆ Laminate Structure -> Active Material Support
    - • Proper Selection to minimize Gas Entrapment

Fig. 14

Modifications Applied to Existing Markets

- Improved Enveloper Runnability
- Lower Separator Electrical Resistance
- Lower Gas Entrapment

Fig. 15

Challenges / Opportunities

- Utilization of Active Material
- Deleterious Effects of Sulfation
- Minimize Corrosion
- Prevent Shedding

- Historic Evolution
- Separator Modifications

Fig. 16

Historical Development

Wood Shingles          1900 – 1950s

Rubber                 1930 – ongoing*

Cellulosic             1950 – 2000

Sintered PVC           1960 – 2010

PE Separator           1980 – ongoing

Modified PE for Deep Cycling  2000 – ongoing

* Used in Niche Applications Today

Fig. 17

Separator Properties

- Sub Micron Pore Size
  Short Prevention

- Low Acid Displacement
  Improved Electrical Capacity

- Oxidation Resistance
  Extended Life

- Sleeve / Pocket Construction
  Side / Bottom Short Prevent

Fig. 19

Antimony Alloys

- Cons

Deposits on Negative -> Depolarization -> Hydrolysis of Water    Answer: Daramic HD and DuraLife®

- Pros

Strengthens Grid for Deep Cycling

Improves Grid to Active Material Interface

Retards Grid Corrosion

Fig. 21

Idle Start/Stop (ISS)

- Dual Functionality
  - High Power (SLI)
  - Frequent Cycling
- Increased Power Delivery
  - Lower Internal Resistance (Separator Resistance)
  - Increase Acid => Diffusion Limitations

Fig. 22

Separator Comparison

| Characteristic | Unit | Daramic HP | DuraLife® |
|---|---|---|---|
| Nominal Thickness | (mils) | 10.0 | 10.0 |
| Oxidation Resistance | | | |
| Residual Mechanical Properties | (%) | 25.9 | 51.6 |
| Basis Weight | (gsm) | 186 | 154 |
| Puncture Resistance | (N) | 12.9 | 14.2 |
| Acid Displacement | ($cm^3/m^2$) | 136.4 | 108.9 |
| Residual Oil | (%) | 14.5 | 12.5 |
| Porosity | (%) | 54.8 | 55.2 |
| Electrical Resistance | ($mohm\text{-}in^2$) | 13.0 | 10.2 |

Fig. 24

Summary

- Lead Batteries +100 years old
- Evolutionary Development
  - Wood Shingles
  - Rubber
  - Cellulosic
  - PVC
  - PE
  - Modified PE for Deep Cycling

Fig. 28

Idle Start – Stop

- High Power to Crank
  - Maximize Acid
  - Minimize Gas Entrapment

- Extend Cycle Life
  - Immobilize Electrolyte Prevent Stratification
  - Laminate to Minimize PAM Shedding

- Broad Application

Fig. 29

Advantages of the Daramic PE Separator

Smallest Pore Size

The maximum pore size of a Daramic PE Separator is less than 1 micron with an average pore size of about 0.1 micron. Separators made from SWP and other types of composite paper and sintered PVC have a much larger pore size which is detrimental to battery life as it is prone to dendrite growth and shorts resulting in battery failure.

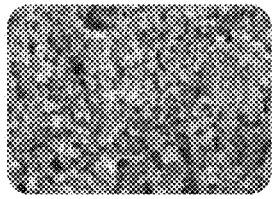

Daramic PE　　　SWP/ Composite/ Other　　　Sintered PVC

Note: The magnified pictures demonstrate the relative pore size of various types of separators.

Very Low Electrical Resistance

Daramic PE Separator can be manufactured with a lower web thickness and hence has a significantly lower Electrical Resistance than other conventional separators like PVC, SWP and other composite separators. Lower Electrical Resistance results in enhanced battery performance even at cold cranking conditions.

Low Acid Displacement

Availability of sufficient acid is very essential for the electrochemical reaction. Given the internal dimensions of the battery container, with more acid around the plates, there are less chances of a dry-out that would result in battery failure. Low backweb and high porosity of the Daramic PE Separator displaces less acid resulting in more acid availability around the plates.

Characteristics of Daramic PE Separator

Daramic PE Separators are manufactured to stringent quality specifications that result in high puncture resistance, very small pore size, low electrical resistance, high porosity and a high resistance to oxidation due to the presence of a special mineral oil and anti-oxidants. This is to ensure that the battery does not fail due to puncture.

Fig. 31

Introducing the Daramic PE Leaf Separator

Daramic Auto PE Leaf Separator

Daramic Auto PE Leaf Separator is made out of Daramic-HP grade PE separator laminated with Glassmat and cut to required size to meet the specification of customers. The lamination of a thicker layer of Glassmat on the PE separator base renders sufficient rigidity to the product for easy insertion between the plates, without compromising the basic qualities and advantages of Daramic PE. The Glassmat serves to retain the acid around the plate and is beneficial for battery performance due to its dual function of maintaining positive plate integrity as well as increasing the oxidation resistance the PE separator. The Glassmat holds the plate tightly resulting in reduced plate shedding caused by vibration.

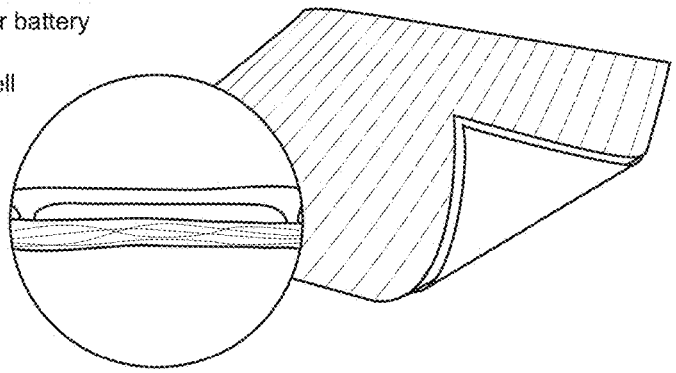

Daramic Industrial PE Leaf Separator

The Daramic Industrial PE Leaf Separator is available in two versions. For the standard high-discharge application, Glassmat is glued to Daramic PE Separator base which has a higher web thickness of around 0.35 mm. The Glassmat (optional) prevents the PE separator base from coming into contact with the positive plate under oxidative conditions, which enhances the cycle life of the PE separator. The higher backweb thickness as compared to an Auto PE separator also gives a longer life to the separator. These separators can be used in Flat Plate Inverter batteries.

For heavy duty applications as in tubular batteries, Daramic recommends the usage of PE separator with a web thickness of 0.45 mm. In addition, the specially designed angular diagonal / sinusoidal front rib on the PE separator significantly reduces the physical contact of the separator back web with the tubular positive plates. The 0.45mm back web thickness will protect the separator from getting oxidized for a longer period in deep cycle applications.

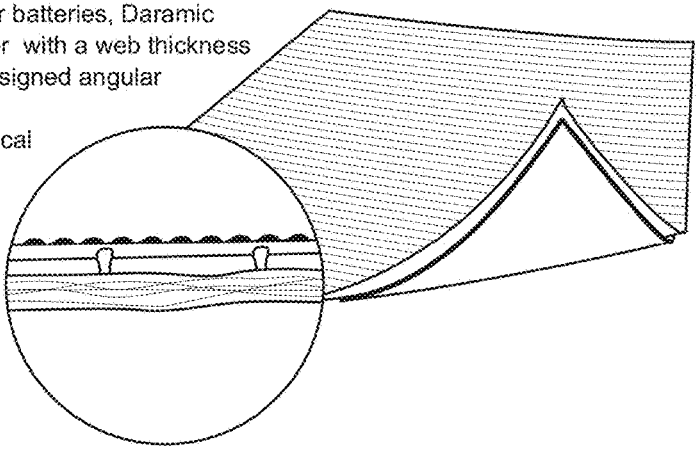

Fig. 32

Separator Comparison

| Characteristics | PE | PVC | Composite Paper | Advantages of PE |
|---|---|---|---|---|
| Average Pore Size (microns) | 0.1 | 15 | 10 | Avoids dendrite shorts |
| Maximum Pore Size (microns) | <1 | 30 | 20 | |
| Electrical Resistance (ohm cm. sq.) | 0.065 | 0.25 | 0.085 | Low electrical resistance enhances cranking performance and also results in higher current output |
| Porosity | 60% | 35% | 74% | |
| Acid Displacement (ml/ sq. m) | 125 | 385 | 130 | Low acid displacement contributes to more active acid in the battery resulting in better performance |
| Oxidation Resistance (hours) | 840 | 300 | 350 | Maximum oxidation resistance in PE Separator with Glass Mat among all separators, contributing to higher life of batteries |
| Puncture Resistance | Good | Very Good | Satisfactory | High puncture resistance in PE Separator protects the separator from the rough edges of the Plate. |

Choice of Usage

Daramic provides you with a choice of procuring the Daramic PE Separator in an Envelope (with or without Glassmat) form, Sleeve form, and in our very new, Leaf form.

Fig. 33

LEAD ACID BATTERY SEPARATORS, BATTERIES AND RELATED METHODS

CROSS-REFERENCE TO RELATED APPLICATIONS

This is a divisional application of co-pending U.S. patent application Ser. No. 13/239,987 filed Sep. 22, 2011 which claimed priority to and the benefit of U.S. provisional patent applications Ser. No. 61/385,253, filed Sep. 22, 2010, to Whear et al., and Ser. No. 61/532,598, filed Sep. 9, 2011, to Whear et al., all are hereby fully incorporated by reference herein.

FIELD OF THE INVENTION

In accordance with at least selected embodiments or aspects, the present invention is directed to new or improved battery separators, batteries including such separators, and/or methods of production, and/or methods of use. In accordance with at least selected embodiments or aspects, the present invention is directed to improved, unique, and/or complex performance lead acid battery separators, such as an improved flooded lead acid battery separators, batteries including such separators, methods of production, and/or methods of use. Where current separator technology has addressed one or two key properties in discrete separators, the preferred battery separator of the present invention addresses and optimizes multiple separator properties simultaneously. It is believed that the present invention is the first to recognize the need to address multiple separator properties simultaneously, the first to choose particular multiple separator property combinations, and the first to produce commercially viable multiple property battery separators as described below.

BACKGROUND

It is helpful to understand the diverse functionality required of different battery separators and the measured property or properties that provide the best indication of meeting the required functionality. First, with respect to inside the battery functionality, the typical lead acid battery separator provides electronic insulation between the opposing electrodes. Simply put, the separator provides a physical barrier so that the electrodes are not allowed to come into physical contact and this function is performed over the life of the battery.

Second, the separator is porous and as such functions or allows for ionic conductance there through. The battery industry has developed a test called separator resistance.

Next, as the battery separator is exposed to a highly oxidative environment, the battery industry has developed a test to measure the resistance of the separator to such an attack, which is called the Perox 80 test. In this Perox 80 test, the separator is placed in oxidizing solution at various times and the residual mechanical properties are measured. The longer the separator can maintain the original strength or a portion thereof, the higher the oxidation resistance and the longer the life in the battery.

In order to reduce fuel consumption and generation of tail pipe emissions, auto manufacturers have implemented varying degrees of electrical hybridization. One form Hybrid Electric Vehicle (HEV) is often referred as the 'Micro HEV' or 'micro-hybrid'. In such Micro HEV or concepts, the automobile has the idle stop/start (ISS) function and often regenerative braking. In order to keep costs down, many auto manufacturers are considering a flooded or enhanced flooded lead acid battery (EFB) to meet the electrical functionality associated with the ISS function. As the functionality associated with this battery is often different than a standard automotive application, such as Starting Lighting and Ignition (SLI) battery, this may result in different functions or preferred performance of the ISS or micro-hybrid battery separator.

A need exists for new or improved battery separators, batteries including such separators, and/or methods of production, and/or methods of use thereof.

SUMMARY OF THE INVENTION

In accordance with at least selected embodiments, examples, objects, or aspects, the present invention address the need for or provides new or improved battery separators, batteries including such separators, and/or methods of production, and/or methods of use, and/or the like.

In accordance with at least selected embodiments or aspects, the present invention is directed to new, improved, unique, and/or complex performance lead acid battery separators, such as an improved flooded lead acid battery separators, batteries including such separators, methods of production, and/or methods of use.

Where current separator technology has addressed one or two key properties in discrete separators, the preferred battery separator of the present invention addresses and optimizes multiple separator properties simultaneously. It is believed that the present invention is the first to recognize the need to address multiple separator properties simultaneously, the first to choose particular multiple separator property combinations, and the first to produce commercially viable multiple property battery separators as described below.

To understand the invention, it is helpful to understand the diverse functionality required of different battery separators and the measured property or properties that provide the best indication of meeting the required functionality. First, with respect to inside the battery functionality, the typical separator provides electronic insulation between the opposing electrodes. Second, the separator functions or allows for ionic conductance there through and preferably minimizes the ionic resistance associated with the separator. The battery industry has developed a test called separator resistance and the present preferred optimum separator will have the lowest value to provide the maximum benefit to the overall battery performance.

Next, as the battery separator is exposed to a highly oxidative environment, the battery industry has developed a test to measure the resistance of the separator to such an attack, which is called the Perox 80 test. In this Perox 80 test, the separator is placed in oxidizing solution at various times and the residual mechanical properties are measured. The longer the separator can maintain the original strength or a portion thereof, the higher the oxidation resistance and the longer the life in the battery. Therefore a separator with a higher oxidation resistance is of value and preferred.

There are yet other benefits the separator can add to the functionality inside the battery, such as minimizing water loss and emitting low amounts of organic compounds. The majority of the flooded lead acid batteries are constructed in such a manner that water can not be added by the consumer later in life. However, the typical automotive lead acid battery is contained in the motor compartment where temperatures can be substantially above ambient conditions and this can lead to the evaporation of water from the battery electrolyte. Also, if the battery is regularly overcharged, the water of the electrolyte can be decomposed via hydrolysis. Therefore, the preferred separator can minimize water loss of the overall battery with the resultant benefit of extending the life of the battery which may have otherwise failed earlier due to dry out. Likewise, regarding the life of the battery, another failure mode is positive grid corrosion. To avoid contributing to positive grid corrosion, battery manufacturers have desired that the separator have a minimum amount of leachable organic compounds. It has been conjectured that the organic compounds will oxidize and may produce acetate compounds which greatly increase the solubility of the lead components such as the grid and may cause even earlier failures. Therefore a preferred separator will offer a minimum amount of leachable compounds.

After considering the functionality inside the battery, we then consider properties of the separator outside the battery such as properties that provide the preferred optimum speeds and yields during the battery assembly process. As the separator is used to separate electrodes which can often have sharp edges, corners or extending wires, it has been recognized that the ability of the separator to resist puncturing is of value to prevent shorts that have the potential to occur during assembly. To that end, the industry has adapted a standard test for measuring puncture resistance of the separator. Therefore the preferred separator will have a higher puncture resistance.

Also associated with assembly, is the ability of the separator to process on high speed enveloping equipment, which is used as a part of the assembly process. To minimize separator electrical resistance and lower the mass, volume and cost components of the separator the substrate or back-web thickness of the separator has decreased substantially since the introduction of the separator. As the separator substrate thickness decreases, the ability to process on high speed enveloping equipment is compromised and typically enveloping speeds need to be reduced and or the enveloping yields will drop. Also, as the bending stiffness of the separator is decreased, this may cause more issues on enveloper equipment. Therefore the preferred separator will address these issues and allow for reductions in mass, volume and/or cost, while maintaining a high level of bending stiffness in order to process successfully, with higher yields, at high speeds on the enveloping equipment.

The below Tables 1 to 3 are listings of various Characteristics (properties, performance, structure, composition, and/or values) related to at least certain examples or embodiments of the present invention (referred to as Daramic III). Also, are provided selected preferred ranges, levels or values. Although there may be currently available products that meet one or two of the properties and may fall in the desired optimum range for such one or two limited properties, it is only the separators of the present invention that meet all the properties simultaneously, in the preferred ranges, for at least selected multiple property embodiments of the present invention.

TABLE 1

| Description | units | Acid Leachable Total Organic Carbon |
|---|---|---|
| Daramic III sample #1 | ppm | 39 |
| Daramic III sample #2 | ppm | 41 |
| Preferred Desired Level for Daramic III (TOC) <75 | | |

TABLE 2

| Characteristic | nit | Daramic III sample 1 | Daramic III sample 2 |
|---|---|---|---|
| Backweb | mils) | 8.1 | 8.6 |
| Basis Weight | gsm) | 134.8 | 120.1 |
| Stiffness (CMD) | mN) | 33.3 | 38.0 |
| Preferred Desired Level for Daramic III (Stiffness) >20 | | | |
| Preferred Desired Level for Daramic III (Basis Weight) <150 | | | |

TABLE 3

| Characteristic | Units | Daramic III sample 1 | Daramic III sample 2 | Optimum Range |
|---|---|---|---|---|
| Backweb Thickness | microns | 200 | 250 | 125-250 |
| Puncture Resistance | N | 10.5 | 12.5 | >10 |
| Oxidation Resistance (Perox @ 40 hours) | % of original CMD Elongation | 67 | 75 | >50 |
| Electrical Resistance | mohms-in2 | 8.7 | 9.3 | <10 |
| Water Loss with Antimony Alloy | g/Ah | 1.2 | 1.2 | <1.5 |
| with Non Antimony Alloy | g/Ah | 0.7 | 0.7 | <0.8 |

The complete description and drawings of separators with negative cross ribs of various configurations and methods of U.S. patent application Ser. No. 61/253,096, filed on Oct. 20, 2009, entitled "LEAD ACID BATTERY SEPARATORS WITH CROSS RIBS AND RELATED METHODS" and of pending U.S. patent application Ser. No. 12/904,371, filed on Oct. 14, 2010, entitled "BATTERY SEPARATORS WITH CROSS RIBS AND RELATED METHODS" are each hereby fully incorporated by reference herein.

BRIEF DESCRIPTION OF THE DRAWINGS

Drawing sheets 1 to 33 are respective text, graphical, tabular, illustrations, slides, or images and are fully made part of this application and relied upon for all they show and disclose. For example, FIGS. 5 and 26 may show preferred separator embodiments with transverse or cross ribs on one side or face thereof.

DETAILED DESCRIPTION OF THE INVENTION

In accordance with at least certain embodiments, the present invention is directed to a new, improved or optimized flooded lead acid battery separator which is optimized for at least 3 of the below listed 7 Characteristics (properties, performance, structure, and/or the like) in Table 4, preferably for at least 4 of the below listed 7, more preferably for at least 5 of the below listed 7, still more preferably for at least 6 of the below listed 7, and most preferably for all 7 of the below listed 7 Characteristics.

In accordance with at least selected embodiments, the present invention is directed to a new, improved or optimized lead acid battery separator which is optimized for at least 3 of the below listed 7 Characteristics (properties, performance, structure, and/or the like), preferably for at least 4 of the below listed 7, more preferably for at least 5 of the below listed 7, still more preferably for at least 6 of the below listed 7, and most preferably for all 7 of the below listed 7.

In accordance with at least yet another embodiment, the present invention is directed to an lead acid battery separator having negative cross ribs and which is optimized for at least 2 of the below listed 7 Characteristics (properties, performance, structure, and/or the like), preferably for at least 3 of the below listed 7, more preferably for at least 4 of the below listed 7, yet more preferably for at least 5 of the below listed 7, still more preferably for at least 6 of the below listed 7, and most preferably for all 7 of the below listed 7.

TABLE 4

| Characteristic | Units | Optimum Range |
|---|---|---|
| Backweb Thickness | (microns) | 125-250 |
| Oxidation Resistance | | |
| Perox 40 hours | % of Original | >50 |
| Electrical Resistance | mohms-cm2 | <60 |
| Puncture Resistance | N | >10 |
| CMD Bending stiffness | mN | >45 |
| Water Loss | g/Ah | |
| Antimony Alloy | | <1.5 |
| Non Antimony Alloys | | <0.8 |
| Leachable Organic Carbons | ppm | <200 |

Figure 26:
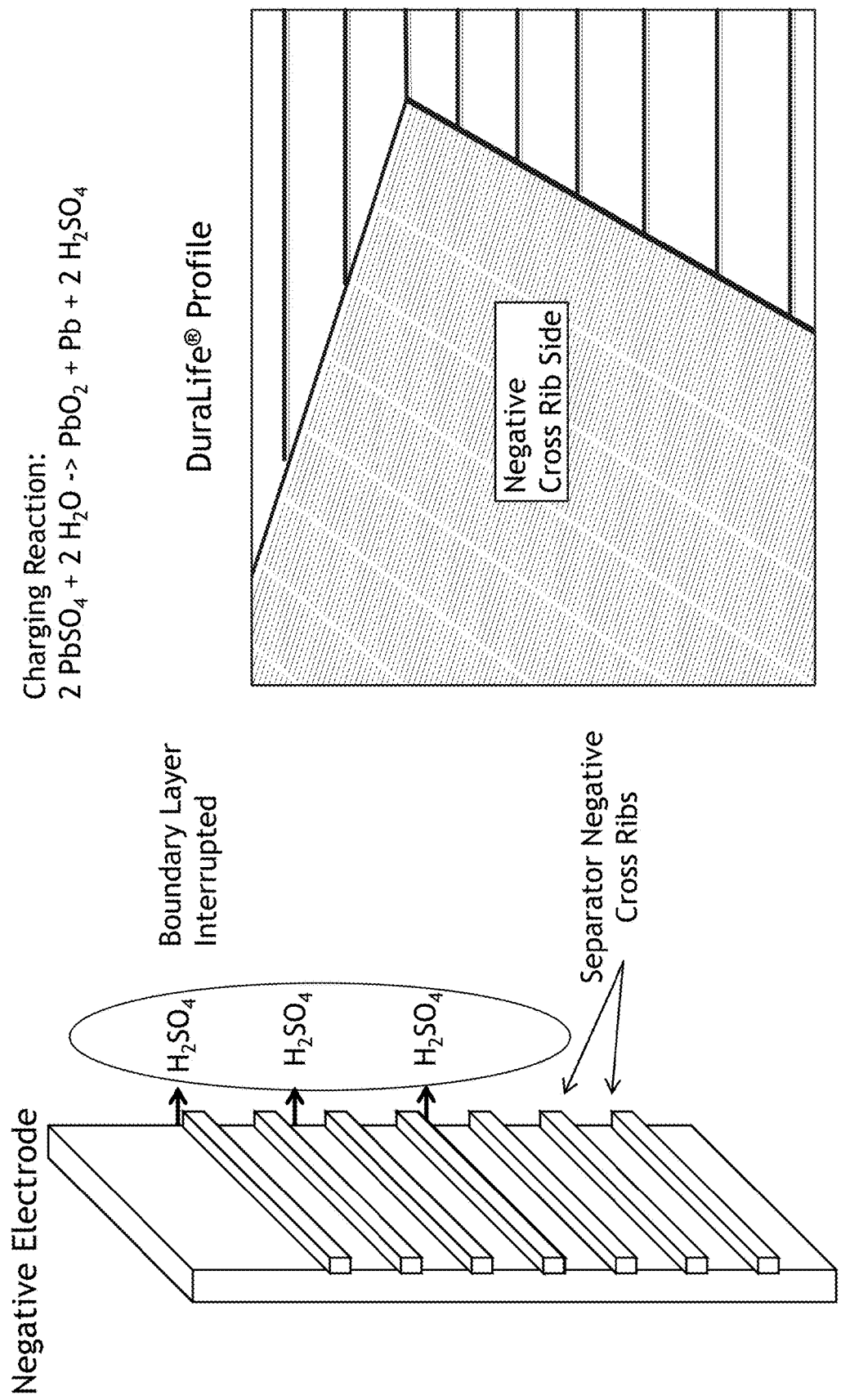

To maintain and even improve the runnability of the separator, we propose to increase the bending stiffness of the separator with tightly spaced transverse ribs on the side of the separator facing the negative electrode. (See FIGS. 5 and 26) Multiple tests on commercial envelopers with Daramic Duralife® separators which include the negative cross ribs have shown substantial improvements in processing yields when comparing separators with the standard flat surface. Increasing the bending stiffness results in improved enveloper processing and now we consider separators with thinner baseweb or backweb (BW) thickness such that we can foresee further decreases in separator electrical resistance by as much as 25% or more.

By decreasing the separator thickness, we see a two-fold benefit to the battery performance. First off, with 25% lower separator electrical resistance; the result will be improved power delivery and charge acceptance of the battery. Second, with less volume occupied by the separator, there will be more acid between the electrodes. As many batteries are designed to be electrolyte starved, replacing separator mass with acid can only yield benefits in terms of electrical storage capacity of the battery.

There are other considerations for lowering separator electrical resistance and increasing the amount of acid between the electrodes. Today, the typical PE separator has a porosity of 60%, or to say it another way, 40% of the separator volume is occupied by mass. If we reduce the mass of the separator by half, say to 20%, the electrical resistance will be reduced in similar proportion and result in 80% separator porosity. To confirm our assumptions we have produced experimental separators with varying porosity and measured the resultant electrical resistance.

By utilizing a special type of silica (such as high surface area silica), the PE separator can be made with very high porosity and result in lower electrical resistance. The preferred separator with the ultimate lowest electrical resistance could be constructed by marrying the negative cross rib with the thin BW thickness and very high porosity.

Figure 8:
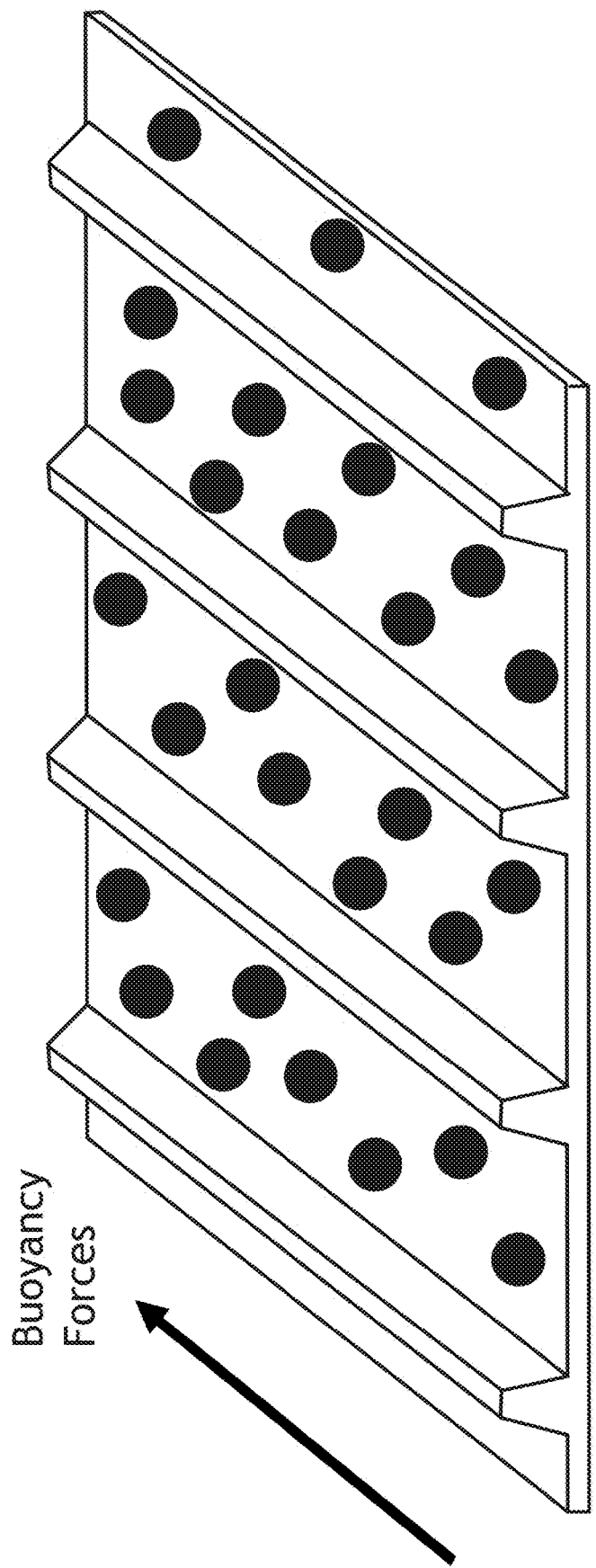

There is another method that we think will lower the functional electrical resistance of the separator thus yield improvements in battery performance. We purposely used the term 'functional' electrical resistance and this we want to compare to the 'measured' electrical resistance of the separator. Today the separator electrical resistance is often quantified with a device where voltage is applied across a single paired electrode chemical cell. The resistance is measured with and without the separator between the electrodes thus quantifying the electrical resistance of the separator. Though this method is of value for predicting the influence of the separator on battery performance, we think there is an important element missing, namely gas entrapment. (See FIG. 8)

During formation or a charging event, once the electrodes are charged, oxygen and hydrogen are produced at the positive and negative electrodes respectively. As electrolyte quickly becomes saturated with these gases, bubbles are produced. As these bubbles in the electrolyte form they will coalesce and finally rise to the surface of the electrolyte similar to the carbon dioxide in a freshly poured glass of beer. However, the process of evacuating the gases is relatively slow and the impact upon battery performance is profound. Like the glass of beer, these tiny bubbles attached to various surfaces including that of the separator. Where the bubbles are attached there is a lack of electrolyte and these regions become areas of high resistance. Therefore, the 'functional' electrical resistance of the separator can be described as the measured electrical resistance and with the proportion of the surface area that is blinded by these gas bubbles taken into account.

To measure the entrapped gas, cells were prepared with standard and modified separators. (See FIG. 9) After formation and overcharging the electrolyte level was recorded for each cell, a vacuum was pulled to evacuate the gases; the difference in level is what we define as the entrapped gas. To establish a base line, cells were tested without separators; instead glass rods were used to maintain electrode spacing. From this work we can gain information regarding the amount of gas entrapment associated with the electrodes. As you can see from the below Table 5 (or FIG. 10), adding standard separators more than doubles the amount of gas trapped when compared to cells without separators. With the modified separator, namely Daramic® Duralife® with negative cross ribs, we can reduce the gas entrapment associated with the standard separator by approximately 50%.

TABLE 5

| Description | Height Change after (mm) | Est. Gas (cc) |
|---|---|---|
| Cell with no separator (glass rods) | 6.9 | 52.3 |
| Cell with standard separator | 15.6 | 118.0 |
| Standard separator (Minus Plate) | | 65.7 |
| Cell with no separator (glass rods) | 6.9 | 52.3 |
| Cell with DuraLife ® separator | 11.6 | 87.8 |
| DuraLife ® separator (Minus Plate) | | 35.5 |

Earlier, we proposed methods for lowering separator electrical resistance by adding negative cross ribs to improve enveloper runnability, which opens the door for processing separator materials with thinner backweb thickness than are currently available today. Initially one might be concerned that the negative cross ribs would actually increase gas entrapment. It is important to note here that the negative cross rib was one of the changes included with the Daramic Duralife® separator which had less gas trapped than the standard separator. We have theorized that the negative cross rib pattern may serve as a medium for coalescence of the small gas bubbles into larger bubbles so that the buoyancy forces become greater than the surface adhesion forces and allow the gases to escape faster than when using standard separators.

Thus far, we have demonstrated methods to lower the electrical resistance by 25 to 50% as compared to standard separators with two independent actions. Through our testing we have also found methods to reduce the amount of gas entrapped on the separator surface by more than 40% which should yield an equivalent reduction in functional separator electrical resistance. By combining all these changes together, one could expect to see the functional resistance decrease to 25 to 50% of the typical separator value. This can provide improvement for power delivery and charge acceptance in Micro Hybrid batteries, ISS batteries, etc.

Earlier on we proposed that the Micro Hybrid battery was a cross between a high power automobile battery and a high energy deep cycling battery. So let us spend a few minutes considering improvements to the deep cycling aspect required in the application. When a lead acid battery is cycled frequently or deeply the positive active material will shed, the negative active material will sulfate, the negative lugs may thin, the acid is likely to stratify especially when operated in a partial state of charge and finally hydration shorts may develop through the separator. Many design options are being explored to address these situations but let's review those associated with the separators. If we can keep the active material in place longer, then we can extend the functional life of the battery. To prevent shedding of the active material, there are two options: First the number of ribs on the separator can be increased thus providing more points of contact for keeping the positive active material in place; and, Second is to add a laminate, such as glass-mat to the separator.

The laminate provides a positive support to prevent the shedding of positive active material. However these laminates must be carefully selected so as not to increase gas entrapment, which will increase the functional electrical resistance, and lower power delivery and charge acceptance of the battery. Utilizing the method previously described, we conducted gas entrapment tests on separators with various laminates. From the laboratory work, we first determined the amount of entrapped gas associated with the plates and the separator so that we can see the influence of various laminates. From the testing we can see vast difference between various laminates with regard to level of gas entrapment. Therefore to maintain good charge acceptance and power delivery, while maintaining good protection against shedding of positive active material we believe it is necessary to select the correct laminate.

There is another point of synergy between cycling and good electrical performance. In our earlier work we identified methods to increase the electrolyte between the electrodes. This was achieved by lowering the separator back-web thickness, increasing the separator porosity and decreasing the amount of entrapped gas on the separator. In general, we believe that these steps will also prevent hydration shorts, the onset of acid stratification and the sulfation of the negative electrode. Thus we believe that more acid between the plates will improve charge acceptance, power delivery and extend the functional life of the battery used in a micro-hybrid application.

To that end, we have put forth separator concepts that will yield battery improvements. To improve power output and charge acceptance of the battery, methods to lower the separator electrical resistance which includes 1) Implementation of negative cross rib, with the Duralife® Separator, allowing for the enveloping of thin separators and 2) Methods to substantially increase the porosity of the separator and drastically decrease the electrical resistance. The aforementioned modifications will also serve to increase the available acid between the plates and thus increase the electrical capacity of the battery when electrolyte limited. To also increase the amount of acid between the plates, we proposed methods for encouraging the gas coalescing and evacuation which will lead to better electrical performance.

To extend the functional performance of the lead acid battery especially in deep cycling applications, we proposed increasing the number of ribs to provide more contact points for the positive active material which is more likely to shed during heavy cycling. Another method to prevent the shedding of the active material is to add a laminate to the separator. However this laminate should be carefully selected to minimize the amount of gas entrapped and thus yield the maximum power delivery and charge acceptance of the battery. There is more description below on extending cycle life by minimizing the onset of acid stratification or preventing hydration shorts through the separator.

We believe these new concepts developed for the micro hybrid application can be applied immediately to existing products serving current market needs. For instance, improved enveloper runnability will be well received benefit to the battery manufacturer looking to further improve his plant efficiencies. Separator modifications that reduce the amount of gas entrapment and thus yield improved power and electric functionality can be benefit to a battery manufacturer struggling to make ratings of an existing battery.

The present invention may be well suited for microporous material (e.g. pores less than 1 micron), but it also applies to other porous and macroporous (e.g. pores greater than 1 micron) materials including separators made from rubber, PVC, synthetic wood pulp (SWP), glass fibers, cellulosic fibers, polypropylene, and combinations thereof.

In accordance with at least selected embodiments or aspects, the present invention is directed to new, improved, unique, and/or complex performance lead acid battery separators, such as an improved flooded lead acid battery separator, batteries including such separators, methods of production, and/or methods of use. The preferred battery separator of the present invention addresses and optimizes multiple separator properties simultaneously. It is believed that the present invention is the first to recognize the need to address multiple separator properties simultaneously, the first to choose particular multiple separator property combinations, and the first to produce commercially viable multiple property battery separators, especially such a separator having negative cross ribs.

Also, we were the first to develop a multi-functional battery separator which could be used in several different types of batteries (for example, in flooded lead acid batteries, in deep cycle lead acid batteries, in industrial lead acid batteries, and/or the like). This may make it easier for at least certain battery manufacturers to stock the correct separator.

The present invention is not limited to separators for flooded lead acid batteries, such as polyolefin separators, preferably filled polyethylene separators, but also applies to separators for capacitors, accumulators, gel batteries, polymer batteries, battery/capacitor combinations, electrochemical cells, porous membranes, porous films, porous laminates, coated membranes, and combinations thereof.

An exemplary lead acid battery, for example, a flooded lead acid SLI battery, includes a negative plate (electrode) and a positive plate (electrode) with a separator sandwiched there between. These components are housed within a container that also includes terminal posts, vents, and gang-vent plugs. In accordance with a preferred embodiment, the separator has transverse ribs on the surface that faces negative plate and has longitudinal ribs on the surface that faces the positive plate (see, for example, FIGS. 5 and 26). Although a particular battery is shown in FIG. 31, the inventive separator may be used in many different types of batteries or devices including for example, but not limited to, sealed lead acid, flooded lead acid, ISS lead acid, combined battery and capacitor units, other battery types, capacitors, accumulators, and/or the like.

Figure 1:
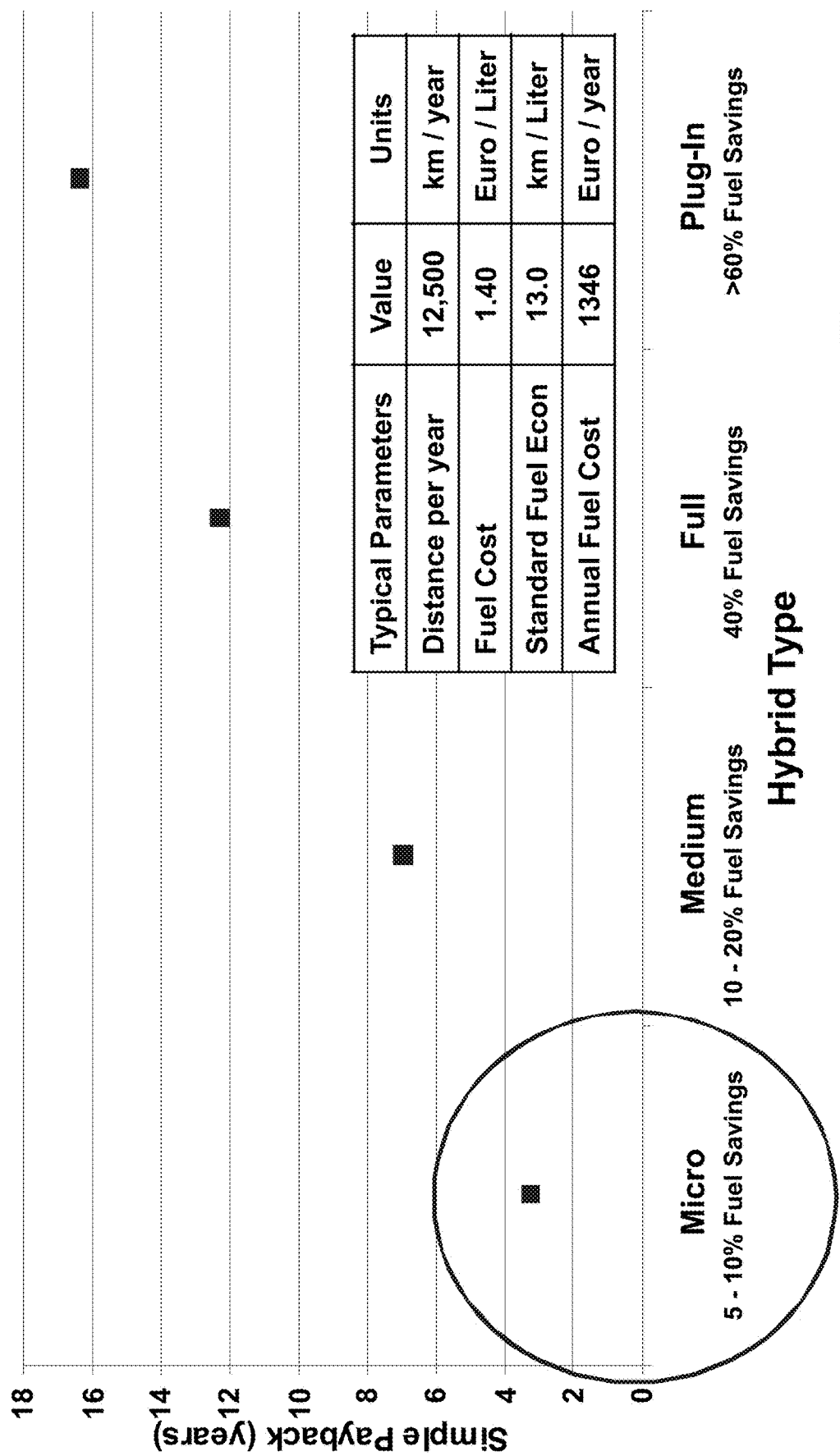
Figure 4:
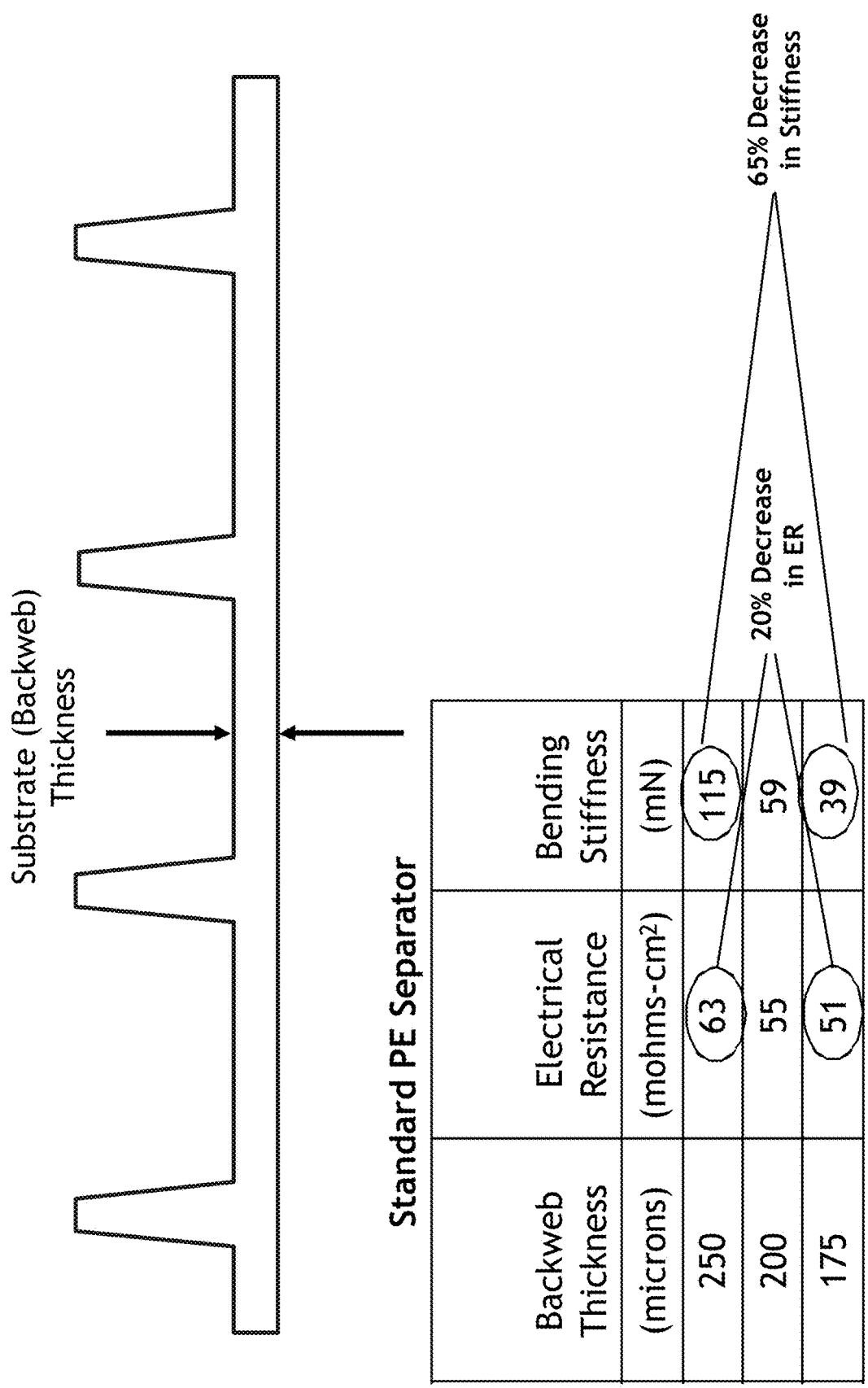
Figure 5:
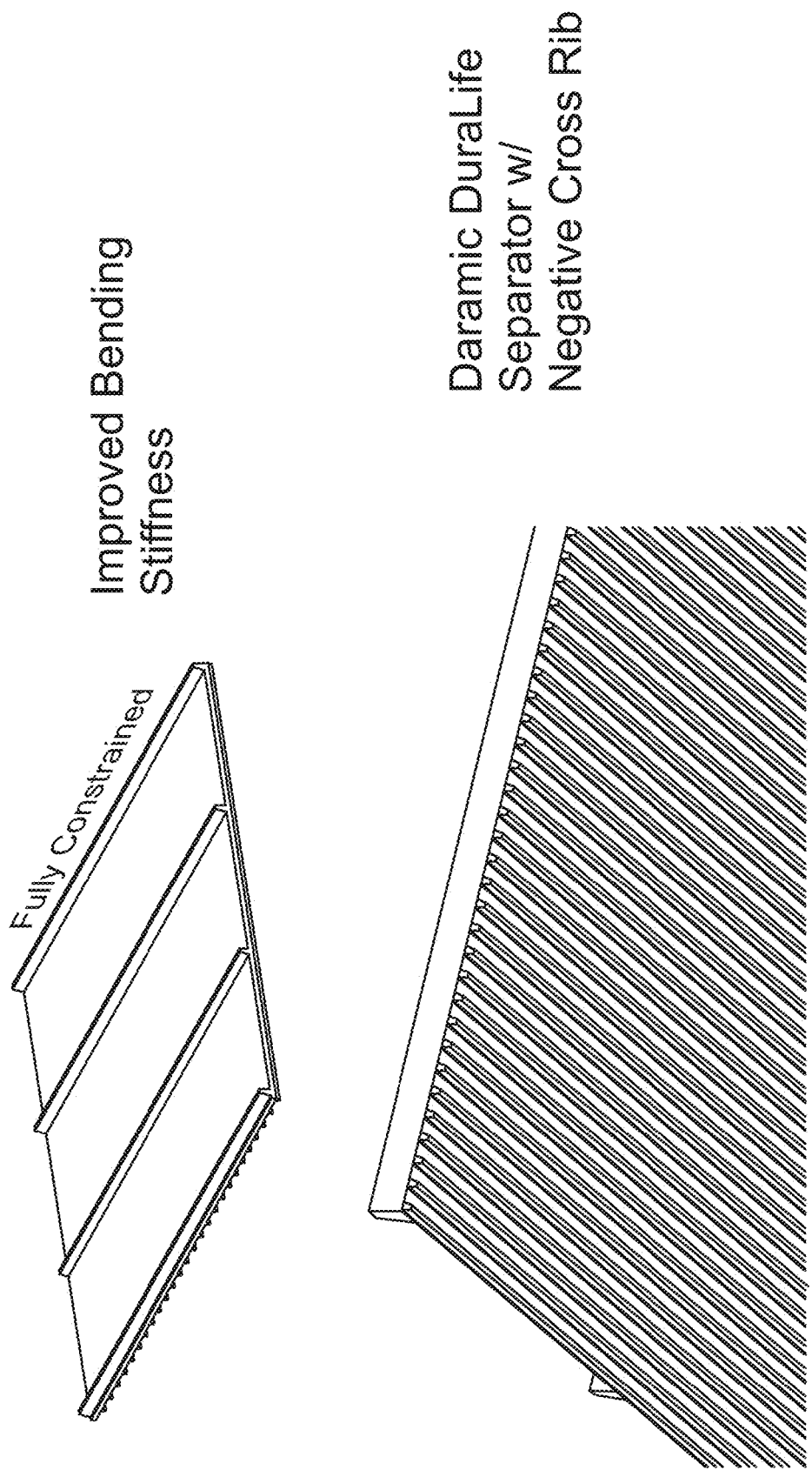
Figure 6:
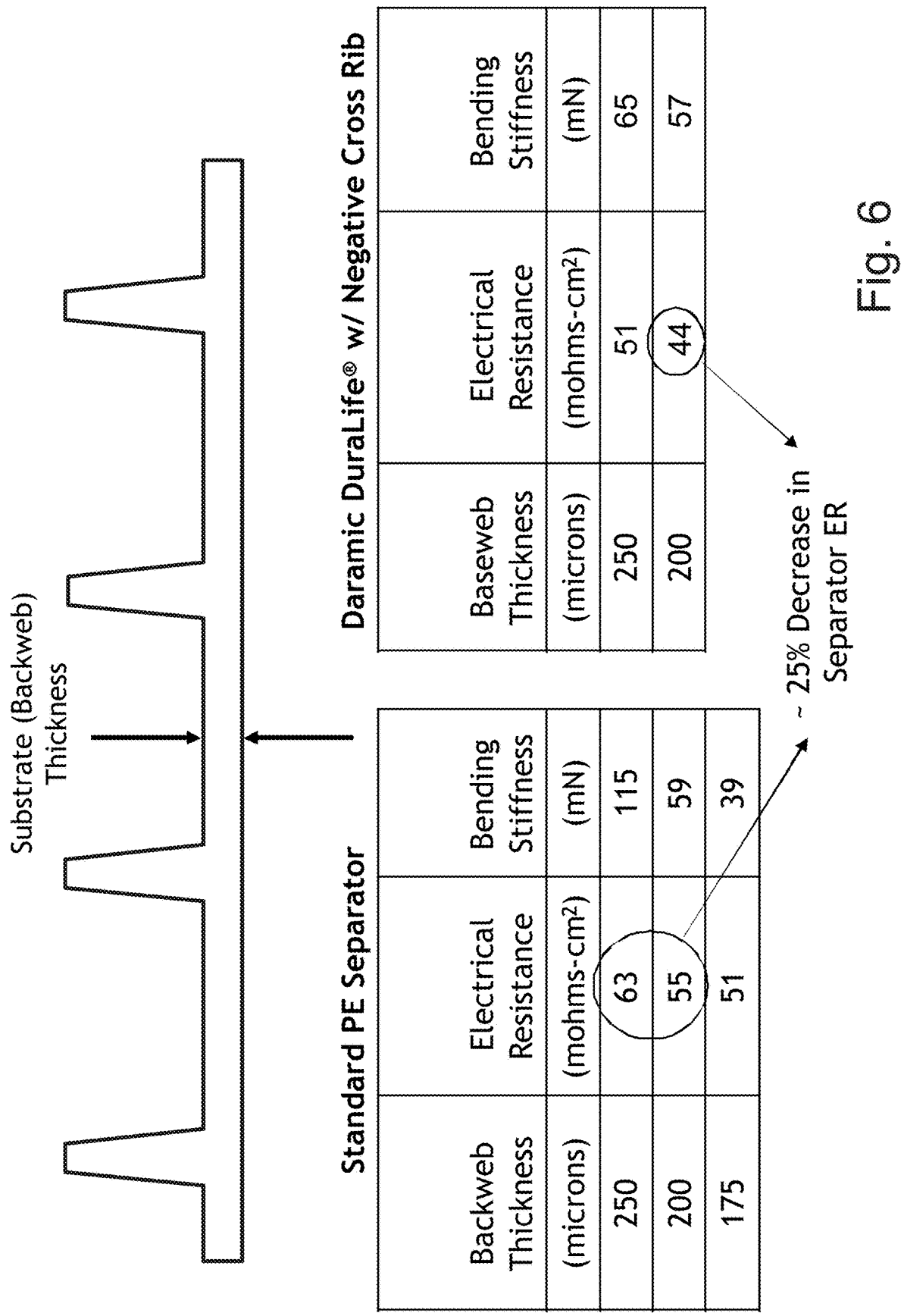

The possibly preferred separator embodiment of FIGS. 5 and/or 26, is preferably a porous polymer membrane (such as a microporous polyethylene membrane having pores less than about 1 micron). Nevertheless, the inventive separators may be microporous or macroporous membranes (having pores greater than about 1 micron) made of natural or synthetic materials, such as polyolefin, polyethylene, polypropylene, phenolic resin, PVC, rubber, synthetic wood pulp (SWP), glass fibers, cellulosic fibers, or combinations thereof, more preferably a microporous membrane made from thermoplastic polymers. The possibly preferred microporous membranes may have pore diameters of about 0.1 micron (100 nanometers) and porosities of about 60%. The thermoplastic polymers may, in principle, include all acid-resistant thermoplastic materials suitable for use in lead acid batteries. The preferred thermoplastic polymers include polyvinyls and polyolefins. The polyvinyls include, for example, polyvinyl chloride (PVC). The polyolefins include, for example, polyethylene, ultrahigh molecular weight polyethylene (UHMWPE), and polypropylene. One preferred embodiment may include a mixture of filler (for example, silica and/or reactive mineral) and UHMWPE. In general, the preferred separator precursor may be made by mixing, in an extruder, about 30% by weight filler with about 10% by weight UHMWPE, and about 60% processing oil. The mixture may also include minor amounts of other additives or agents as is common in the separator arts (such as wetting agents, colorants, antistatic additives, and/or the like) and is extruded into the shape of a flat sheet. The ribs are preferably formed by the engraved surfaces of opposed calender rollers. Thereafter, much of the processing oil is extracted, and the microporous membrane is formed.

Figure 27:
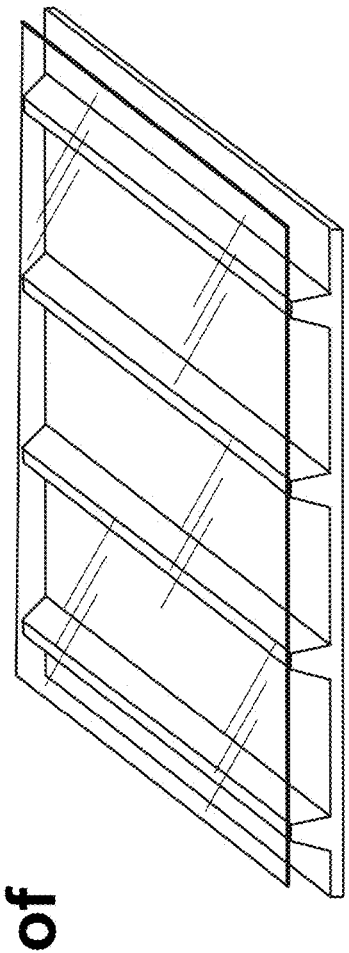
Figure 30:
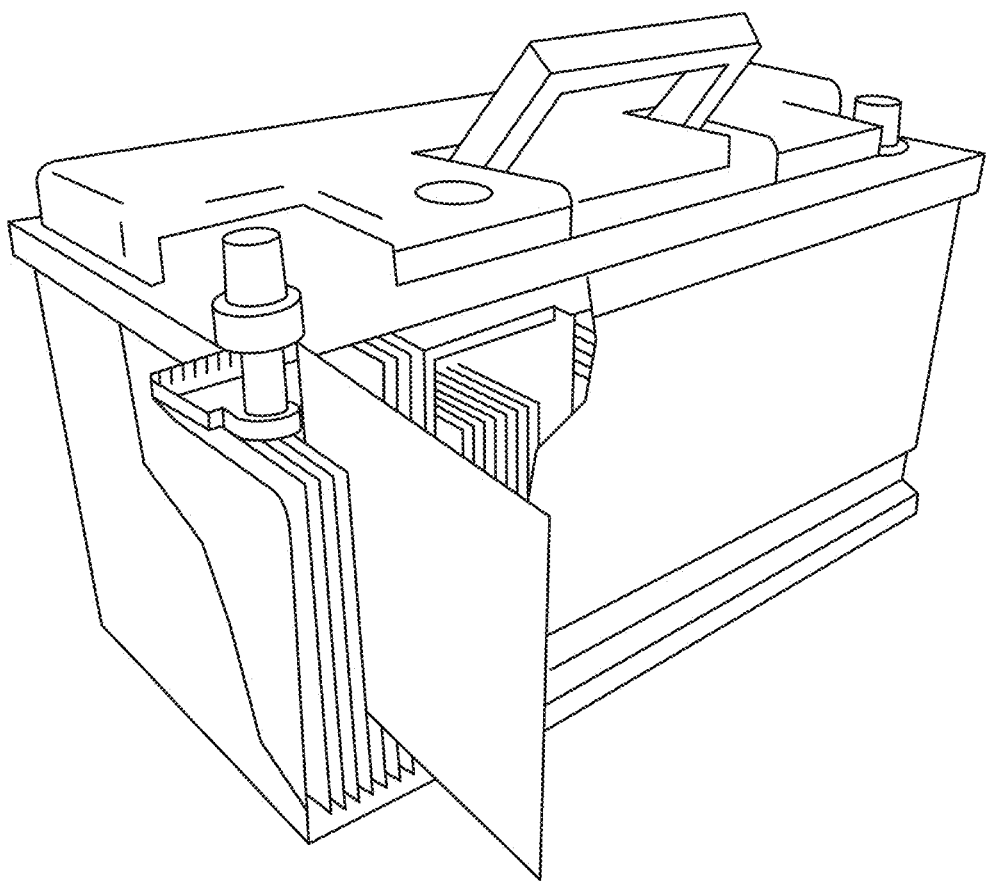

With reference again to FIGS. 5 and 26 of the drawings, in accordance with one particular example, the negative cross ribs are about 4 mils thick, the backweb is about 6 mils thick and the positive ribs are about 20 mils thick (total separator thickness about 30 mils). The preferred separator may be a cut piece or leaf separator (of FIG. 33) or a wrapping, envelope, pouch, pocket, with or without an optional laminate (see FIG. 27), glassmat (of FIG. 33), or synthetic non-woven, and may have minor transverse cross-ribs on the opposite face of the separator as the major longitudinal ribs.

The transverse cross-ribs on the opposite face of the separator as the longitudinal ribs increase stiffness and protection of the sheet allowing for reduction of mass of the back-web, reduced ER, reduced cost, and increased physical properties such as may be required for high speed production and assembly (including high speed separator, envelope, and/or battery production and/or assembly). Such separators or precursors can be produced in rolls, envelopes (or pockets) and pieces, and may be used where processing of separators by high speed automation or hand assembly is utilized and high productivity is desired.

Also, the mass of the separator can be reduced while maintaining physical properties needed for processing and performance inside the battery by adding transverse or cross ribs opposite, for example, the major longitudinal ribs. The mass of the major rib is preferably reduced when the cross ribs are added to the opposite side to achieve the desired overall separator thickness (major rib+backweb+cross rib). The sheet can also be reduced in thickness and/or mass while maintaining productivity properties such as rigidity as well as protecting the sheet from abrasion and oxidation rips and tears during the life of the battery by adding transverse or cross ribs.

In accordance with at least one example or embodiment, small, tightly spaced transverse ribs are added to the side of the lead acid separator which contacts the negative electrode (preferably in addition to major ribs on the positive side). The small, tightly spaced negative transverse ribs can be in many different forms, including without limitation, sinusoidal, diagonal or straight rib patterns, that are continuous or discontinuous. For ease of processing, rounded straight ribs may be preferred.

The positive longitudinal major ribs can take many forms that run substantially in the longitudinal directional, for example, sinusoidal, diagonal or straight ribs, which are continuous or discontinuous. For ease of processing, rounded straight ribs may be preferred. In certain battery designs, often referred as the Japanese Design, there are no positive ribs, instead they are replaced with a heavy glass-mat laminated to the flat positive face of the separator. In this glass-mat positive face separator embodiment, the transverse negative ribs of the present invention function in the same fashion as the embodiments with positive longitudinal ribs. The positive face may be smooth or flat, have projections, have ribs, or have a nonwoven bonded or laminated thereto. Such nonwoven materials may be formed of synthetic, natural, organic or inorganic materials or blends, such as fiberglass, polyester (PET), recycled PET, or combinations thereof (with or without the inventive reactive minerals). The separator may be a cut piece separator or a wrap, envelope, pouch, or pocket type separator.

With regard to at least selected particular embodiments or examples of separators, the preferred separator has the following:
1) Transverse Rib Height—preferably between about 0.02 to 0.30 mm, and most preferably between about 0.075 to 0.15 mm.
2) Sheet (Substrate) Thickness—preferably between about 0.065 to 0.75 mm.
3) Overall Thickness (positive rib+backweb+negative rib)—overall thickness of the separator preferably between about 0.200 to 4.0 mm.
4) Mass Reduction—preferably greater than 5%, more preferably greater than 10%. The transverse ribs increase the transverse rigidity of the separator and allow for the backweb or substrate thickness to be decreased. Mass can be removed from both the backweb and positive ribs while maintaining and increasing the transverse rigidity. Also, the transverse negative ribs contribute to overall thickness of the separator. Therefore the height of the longitudinal positive rib can be directly reduced by the height of the negative cross rib.
5) Type of Separator—the separator can be made of porous materials, such as microporous or macroporous thermoplastic material, preferably polyethylene, polypropylene, polyvinyl chloride, and the mixtures thereof, as well as of rubber, polyolefin, phenolic, crosslinked phenolic resin, cellulosic, glass, or combinations thereof.

Additional or alternative benefits of the addition of negative cross ribs include:

1) Electrical Resistance Reduction—Since the negative cross rib profile design allows for mass removal while maintaining equivalent or higher transverse bending stiffness, the observed electrical resistance will preferably be lower.
2) Minimize Tear Propagation—When the separator is extremely oxidized, a crack or split will likely develop in the backweb and extend parallel to the major longitudinal rib. The negative cross rib will preferably arrest the propagation of such tears due to, for example, the extra mass in the ribs.
3) Side Alignment—In the assembly process, the enveloped plates are aligned horizontally and vertically before the strap is cast to connect the positive and negative electrodes respectively. For vertical alignment, the positive ribs provide a means for the separator and plate to slide when contacting each other. For typical side alignment, the negative plate may slide when contacting the flat backweb. The negative transverse ribs, will preferably offer less surface and should aid in side alignment operation.

In accordance with at least one embodiment, the separator is made up of an ultrahigh molecular weight polyethylene (UHMWPE) mixed with a processing oil and filler of precipitated silica and/or reactive mineral. In accordance with at least one particular embodiment, the negative cross ribs preferably have a 2 to 6 mil radius and a 10 to 50 mil rib spacing.

In accordance with at least selected embodiments, the battery separator includes a porous membrane having a backweb and at least two rows of positive ribs on the positive side of the backweb, and a plurality of negative cross ribs or transverse ribs on the negative side of the backweb. The positive ribs may be straight or wavy, may have a solid portion, and may have a truncated pyramidal shape. The membrane may be selected from the group of polyolefin, rubber, polyvinyl chloride, phenolic, cellulosic, or combinations thereof, and the membrane is preferably a polyolefin material forming a battery separator for a storage battery.

A battery separator is used to separate the battery's positive and negative electrodes, and is typically microporous so that ions may pass there through to the positive and negative electrodes. In lead/acid storage batteries, either automotive or industrial batteries, the battery separator is typically a microporous polyethylene separator having a back web and a plurality of positive ribs standing on the back web. The separators for automotive batteries are typically made in continuous lengths and rolled, subsequently folded, and sealed along its edges to form pouches that receive the electrodes for the batteries. The separators for industrial (traction) batteries are typically cut to a size about the same as an electrode plate (piece separator).

In one embodiment of the present method of making a lead/acid battery separator from a sheet of plastic material, the sheet is calender molded to form cross or negative side transverse ribs or projections, and preferably is calender molded to simultaneously form both positive longitudinal ribs and negative cross or transverse ribs on opposite sides of the sheet.

Once a battery is sufficiently charged and current is continually applied (i.e., overcharging), hydrogen is generated at the negative plate, and oxygen is generated at the positive plate. As hydrogen is formed at the negative plate, it may push the separator away from the negative plate thereby forming a gas pocket which may prevent the escape of gas. At least selected embodiments of the present invention may address this issue and provide an improved battery separator. For example, the negative cross ribs extending across the back or negative surface may be interrupted by flat areas, fissures or recesses behind each positive rib (see FIG. 26). The flats, fissures or recesses may form channels which may extend longitudinally and may provide for the escape of hydrogen gas, may allow for extraction of plasticizer or lubricant from the positive ribs, and/or the like. A separator having such channels that allow any hydrogen gas to escape may be preferred.

In at least one embodiment, the separator is made of a microporous, thermoplastic material which is provided with longitudinal positive ribs and transverse negative ribs with the height of at least a majority of the longitudinal ribs being greater than that of the transverse ribs, and the longitudinal and transverse ribs being solid ribs which are formed integrally from the plastic, characterized in that the transverse ribs extend across substantially the entire back width of the separator. The separator sheet thickness may be approximately 0.10 to 0.50 mm, the height of the longitudinal ribs may be 0.3 to 2.0 mm and the height of the transverse ribs may be 0.1 to 0.7 mm, the longitudinal rigidity with 100 mm width may be approximately 5 mJ and the transverse rigidity may be approximately 2.5 mJ, and the total thickness of the separator may be less than 2.5 mm.

The separators according to the present invention can be manufactured in a similar fashion as conventional polyethylene separators with the addition or substitution of reactive mineral fillers, a negative roll having grooves to form the negative cross ribs, a positive roll having no grooves or grooves of less depth, and/or the like. In a preferred method, the plastic material containing filler is extruded through a slot die to form a film and then run through two calender rolls (positive roll, negative roll) by means of which both the positive longitudinal ribs and the negative transverse ribs are produced and the separator sheet is reduced to the desired thickness. The positive roll may have shallow circumferential or annular grooves which form the positive longitudinal ribs and lands or smooth areas or stripes that form smooth areas on the separator for sealing the edges of the pockets. The negative roll may have shallow axial grooves which form the cross ribs. Also, the negative roll may have spaced sets of shallow axial grooves with smooth lands or areas (for example, for welding zones) there between.

The separators according to the present invention with negative cross ribs preferably have a better machine workability than those without such transverse ribs, a better guidance of the separator tracks as a result of increased transverse rigidity, and the processability for placing the electrode plates in pockets should be improved because of the increased transverse rigidity. In addition, production of separators with a considerably reduced sheet thickness and consequently with a reduced electrical resistance should be possible which is of significance particularly in relation to efforts to constantly increase battery output with a constant battery volume. The separators according to the invention should be able to be processed to form pockets without difficulty on conventional machines. The additional transverse negative ribs should not cause problems either with the welding of the pockets by the use of heat or ultrasonic means or with the mechanical process for producing pockets.

In at least one particular embodiment, the separator made of elastic plastic and suitable for use in a lead acid storage battery, includes sheet material with an inner region and two peripheral regions and having positive ribs running in the longitudinal direction with the longitudinal ribs in the inner region being more widely spaced than those in the peripheral region, and having negative ribs running in the transverse direction.

The inventive lead-acid storage battery may be required not only to supply power as a main power supply for electric cars, but also to provide a new function as a power supply for starting and recovering regenerative current for hybrid electric cars, simplified hybrid cars and ISS-compatible cars having an idle stop and start (ISS) function.

The complete description and drawings of separators with negative cross ribs of various configurations and methods of U.S. patent application Ser. No. 61/253,096, filed on Oct. 20, 2009, entitled "LEAD ACID BATTERY SEPARATORS WITH CROSS RIBS AND RELATED METHODS" and of pending U.S. patent application Ser. No. 12/904,371, filed on Oct. 14, 2010, entitled "BATTERY SEPARATORS WITH CROSS RIBS AND RELATED METHODS" are each hereby fully incorporated by reference herein.

Figure 25:
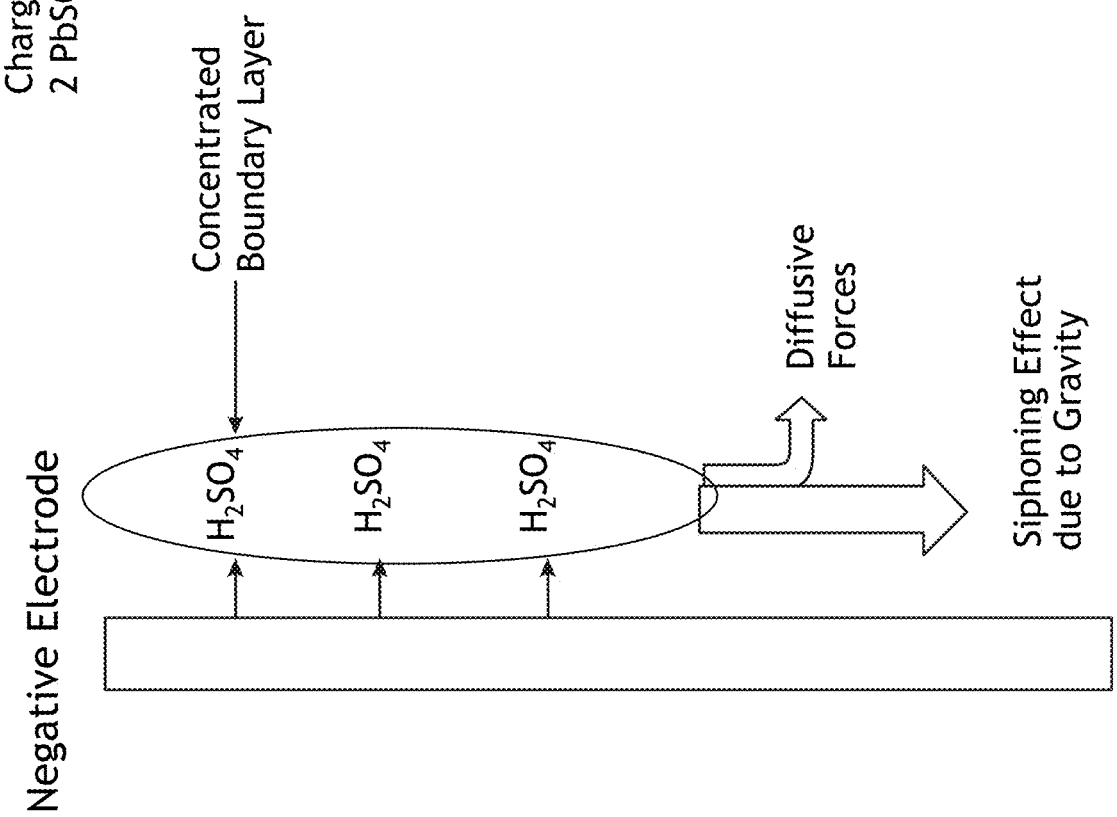

To maintain and even improve the runability of the separator, we propose to increase the bending stiffness of the separator with tightly spaced transverse ribs on the side of the separator facing the negative electrode. (See FIGS. 5 and 26) Multiple tests on commercial envelopers with Daramic Duralife® separators which include the negative cross ribs have shown substantial improvements in processing yields when comparing separators with the standard flat surface. (See FIG. 25) Increasing the bending stiffness results in improved enveloper processing and now we consider separators with thinner baseweb or backweb (BW) thickness such that we can foresee further decreases in separator electrical resistance by as much as 25%.

By decreasing the separator thickness, we see a two-fold benefit to the battery performance. First off, with 25% lower separator electrical resistance; the result will be improved power delivery and charge acceptance of the battery. Second, with less volume occupied by the separator, there will be more acid between the electrodes. As many batteries are designed to be electrolyte starved, replacing separator mass with acid can only yield benefits in terms of electrical storage capacity of the battery.

Figure 7:
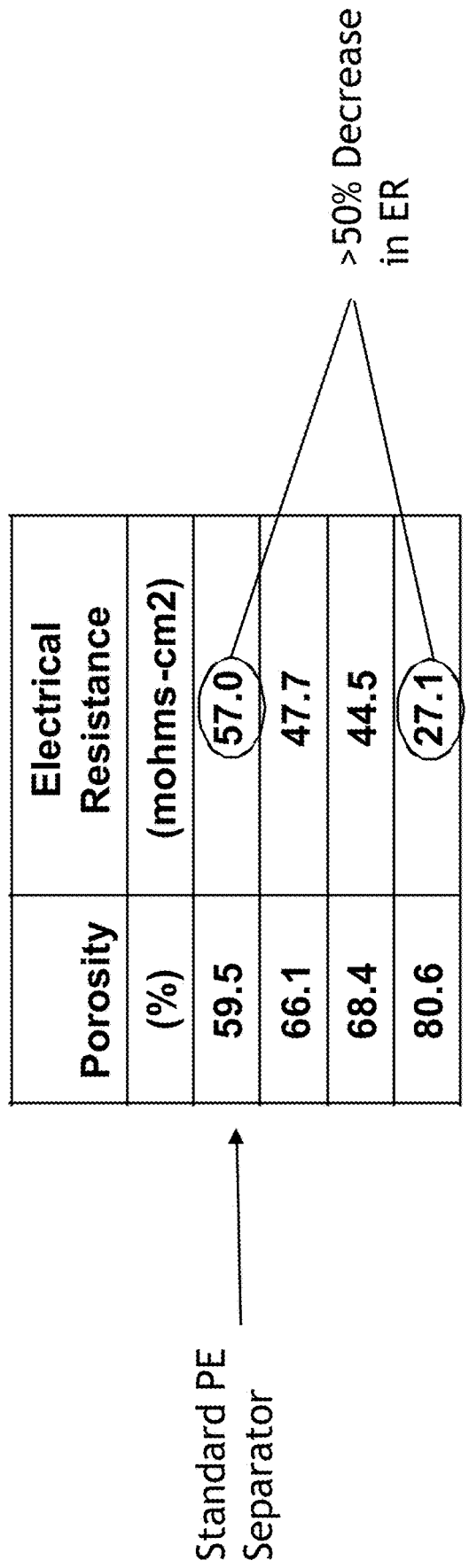

There are other considerations for lowering separator electrical resistance and increasing the amount of acid between the electrodes. Today, the typical PE separator has a porosity of 60%, or to say it another way, 40% of the separator volume is occupied by mass. If we reduce the mass of the separator by half, say to 20%, the electrical resistance will be reduced in similar proportion and result in 80% separator porosity. To confirm our assumptions we have produced experimental separators with varying porosity and measured the resultant electrical resistance. (See FIG. 7)

By utilizing a special type of silica (high surface area), the PE separator can be made with very high porosity and result in lower electrical resistance. The preferred separator with the ultimate lowest electrical resistance could be constructed by marrying the negative cross rib with the thin BW thickness and very high porosity (new silica).

There is another method that will lower the functional electrical resistance of the separator and thus yield improvements in battery performance. We purposely used the term 'functional' electrical resistance and this we want to compare to the 'measured' electrical resistance of the separator. (See FIGS. 8 and 10) Today the separator electrical resistance is often quantified with a device where voltage is applied across a single paired electrode chemical cell. The resistance is measured with and without the separator between the electrodes thus quantifying the electrical resistance of the separator. Though this method is of value for predicting the influence of the separator on battery performance, we think there is an important element missing, namely gas entrapment.

During formation or a charging event, once the electrodes are charged, oxygen and hydrogen are produced at the positive and negative electrodes respectively. As electrolyte quickly becomes saturated with these gases, bubbles are produced. As these bubbles in the electrolyte form they will coalesce and finally rise to the surface of the electrolyte similar to the carbon dioxide in a freshly poured glass of beer. However, the process of evacuating the gases is relatively slow and the impact upon battery performance is profound. Like the glass of beer, these tiny bubbles attached to various surfaces including that of the separator. Where the bubbles are attached there is a lack of electrolyte and these regions become areas of high resistance. Therefore, the 'functional' electrical resistance of the separator can be described as the measured electrical resistance and with the proportion of the surface area that is blinded by these gas bubbles taken into account.

To measure the entrapped gas, cells were prepared with standard and modified separators. (See FIG. 9) After formation and overcharging the electrolyte level was recorded for each cell, a vacuum was pulled to evacuate the gases; the difference in level is what we define as the entrapped gas. To establish a base line, cells were tested without separators; instead glass rods were used to maintain electrode spacing. From this work we can gain information regarding the amount of gas entrapment associated with the electrodes. As you can see from the below Table 5, adding standard separators more than doubles the amount of gas trapped when compared to cells without separators. With the modified separator, namely Daramic Duralife® with negative cross ribs, we can reduce the gas entrapment associated with the standard separator by approximately 50%.

TABLE 5

| Description | Height Change after (mm) | Est. Gas (cc) |
|---|---|---|
| Cell with no separator (glass rods) | 6.9 | 52.3 |
| Cell with standard separator | 15.6 | 118.0 |
| Standard separator (Minus Plate) | | 65.7 |
| Cell with no separator (glass rods) | 6.9 | 52.3 |
| Cell with DuraLife ® separator | 11.6 | 87.8 |
| DuraLife ® separator (Minus Plate) | | 35.5 |

Earlier, we proposed methods for lowering separator electrical resistance by adding negative cross ribs to improved enveloper runnability, which opens the door for processing separator materials with thinner backweb thickness than are currently available today. Initially one might be concerned that the negative cross ribs would actually increase gas entrapment. It is important to note here that the negative cross rib was one of the changes included with the Daramic Duralife® separator which had less gas trapped than the standard separator. We have theorized that the negative cross rib pattern may serve as a medium for coalescence of the small gas bubbles into larger bubbles so that the buoyancy forces become greater than the surface adhesion forces and allow the gases to escape faster than when using standard separators.

Thus far, we have demonstrated methods to lower the electrical resistance by 25 to 50% as compared to standard separators with two independent actions. Through our testing we have also found methods to reduce the amount of gas entrapped on the separator surface by more than 40% which should yield an equivalent reduction in functional separator electrical resistance. By combining all these changes together, one could expect to see the functional resistance decrease to 50 to 25% of the typical separator value. This can provide improvement for power delivery and charge acceptance in Micro Hybrid batteries, ISS batteries, etc.

We proposed that the Micro Hybrid battery was a cross between a high power automobile battery and a high energy deep cycling battery. So let us spend a few minutes considering improvements to the deep cycling aspect required in the application. When a lead acid battery is cycled frequently or deeply the positive active material will shed, the negative active material will sulfate, the negative lugs may thin, the acid is likely to stratify especially when operated in a partial state of charge and finally hydration shorts may develop through the separator. Many design options are being explored to address these situations but let's review those associated with the separators. If we can keep the active material in place longer, then we can extend the functional life of the battery. To prevent shedding of the active material, there are two options: First the number of ribs on the separator can be increased thus providing more points of contact for keeping the positive active material in place; and, Second is to add a laminate, such as glass-mat to the separator.

The laminate provides a positive support to prevent the shedding of positive active material. However these laminates must be carefully selected so as not to increase gas entrapment, which will increase the functional electrical resistance, and lower power delivery and charge acceptance of the battery. Utilizing the method previously described, we conducted gas entrapment tests on separators with various laminates. From the laboratory work, we first determined the amount of entrapped gas associated with the plates and the separator so that we can see the influence of various laminates. From the testing we can see vast difference between various laminates with regard to level of gas entrapment. Therefore to maintain good charge acceptance and power delivery, while maintaining good protection against shedding of positive active material we believe it is necessary to select the correct (or low gas) laminate. (See FIGS. 12 and 13)

There is another point of synergy between cycling and good electrical performance. In our earlier work we identified methods to increase the electrolyte between the electrodes. This was achieved by lowering the separator back-web thickness, increasing the separator porosity and decreasing the amount of entrapped gas on the separator. In general, we believe that these steps will also prevent hydration shorts, the onset of acid stratification and the sulfation of the negative electrode. Thus, we believe that more acid between the plates will improve charge acceptance, power delivery and extend the functional life of the battery used in a micro-hybrid application.

To that end, we have put forth separator concepts that will yield battery improvements. To improve power output and charge acceptance of the battery, methods to lower the separator electrical resistance which includes 1) Implementation of negative cross rib, with the Duralife® Separator, allowing for the enveloping of thin separators and 2) Methods to substantially increase the porosity of the separator and drastically decrease the electrical resistance. The aforementioned modifications will also serve to increase the available acid between the plates and thus increase the electrical capacity of the battery when electrolyte limited. To also increase the amount of acid between the plates, we proposed methods for encouraging the gas coalescing and evacuation which will lead to better electrical performance.

To extend the functional performance of the lead acid battery especially in deep cycling applications, we proposed increasing the number of ribs to provide more contact points for the positive active material which is more likely to shed during heavy cycling. Another method to prevent the shedding of the active material is to add a laminate to the separator. However this laminate should be carefully selected to minimize the amount of gas entrapped and thus yield the maximum power delivery and charge acceptance of the battery. There is more to be said on extending cycle life by minimizing the onset of acid stratification or preventing hydration shorts through the separator. (See FIG. 14)

We believe these new concepts developed for the micro hybrid application can be applied immediately to existing products serving current market needs. For instance, improved enveloper runnability will be well received benefit to the battery manufacturer looking to further improve plant efficiencies. Separator modifications that reduce the amount of gas entrapment and thus yield improved power and electric functionality can be benefit to a battery manufacturer struggling to make ratings of an existing battery.

The present invention may be well suited for microporous material (e.g. pores less than 1 micron), but it also applies to other porous and macroporous (e.g. pores greater than 1 micron) materials including separators made from rubber, PVC, synthetic wood pulp (SWP), glass fibers, cellulosic fibers, polypropylene, and combinations thereof.

In accordance with at least selected embodiments or aspects, the present invention is directed to improved, unique, and/or high performance ISS lead acid battery separators, such as improved ISS flooded lead acid battery separators, ISS batteries including such separators, methods of production, and/or methods of use. The preferred ISS battery separator of the present invention addresses multiple separator properties simultaneously and may include negative cross ribs and PIMS minerals.

The present invention is not limited to separators for ISS flooded lead acid batteries, such as polyolefin separators, preferably filled polyethylene separators, but also applies to separators for capacitors, accumulators, gel batteries, polymer batteries, carbon batteries, battery/capacitor combinations, electrochemical cells, porous membranes, porous films, porous laminates, coated membranes, and combinations thereof.

In accordance with at least selected embodiments or aspects, the present invention is directed to improved, unique, and/or complex performance battery separators, lead acid battery separators, flooded lead acid battery separators, enhanced flooded lead acid battery separators, ISS or micro-hybrid battery separators, ISS flooded lead acid battery separators, ISS enhanced flooded lead acid battery separators, batteries including such separators, systems or vehicles including such batteries or separators, methods of production, and/or methods of use.

Where current separator technology has addressed one or two key properties in discrete separators, one possibly preferred battery separator of the present invention addresses and optimizes multiple separator properties simultaneously. It is believed that in accordance with at least certain embodiments, the present invention is the first to recognize the need to address multiple separator properties simultaneously, the first to choose particular multiple separator property combinations, and the first to produce commercially viable multiple property battery separators as described below.

In order to reduce fuel consumption and generation of tail pipe emissions, auto manufacturers have implemented varying degrees of electrical hybridization. One form Hybrid Electric Vehicle (HEV) is often referred as the 'Micro HEV' or 'micro-hybrid'. In such Micro HEV or concepts, the automobile has the idle stop/start (ISS) function and often regenerative braking. In order to keep costs down, many auto manufacturers are considering a flooded or enhanced flooded lead acid battery (EFB) to meet the electrical functionality associated with the ISS function. As the functionality associated with this battery is often different than a standard automotive application, such as Starting Lighting and Ignition (SLI) battery, this may result in different functions or preferred performance of the ISS or micro-hybrid battery separator.

In accordance with at least selected embodiments or aspects, the present invention is directed to improved, unique, and/or complex performance battery separators, lead acid battery separators, flooded lead acid battery separators, enhanced flooded lead acid battery separators, ISS or micro-hybrid battery separators, ISS flooded lead acid battery separators, ISS enhanced flooded lead acid battery separators, batteries including such separators, systems or vehicles including such batteries or separators, methods of production, and/or methods of use.

Although one possibly preferred embodiment may be a vented or flooded lead acid battery, it is understood that the battery may be an enhanced flooded lead acid battery (EFB), valve-regulated lead-acid (VRLA) battery, low-maintenance lead-acid rechargeable battery, absorbed glass mat (AGM) battery, VRLA AGM battery, gel battery (gel cell), VRLA gel battery, sealed lead-acid battery, "acid-starved" design battery, "recombinant" battery (the oxygen evolved at the positive plate will largely recombine with the hydrogen ready to evolve on the negative plate to create water), polymer, carbon lead acid, or other battery, a capacitor, a super capacitor, an accumulator, a battery/capacitor combination, and/or the like.

Also, the improved separator of the present invention may find special applicability in ISS batteries, ISS systems, ISS vehicles, or may be used in other batteries or devices.

The advent of Micro HEV and ISS with or without regenerative breaking sets new demands on the battery and the battery separator. Such new demands may be addressed or met by at least certain embodiments of the separators, batteries, systems, or methods of the present invention.

The ISS flooded lead acid battery will be operated in a partial state of charge (PSoC), approximately 50 to 80% unlike the typical SLI battery which is usually operated at 100% state of charge. With regenerative braking and frequent restarting, the battery will experience shallow charge and recharge cycles. Depending on the design of the electrical system, the ISS battery may not normally go into overcharge and thus generate oxygen and hydrogen gas which can be useful for acid mixing.

Lead acid batteries continue to grow and expand into new applications. One growing category of application is referred to as deep cycling, where the battery is frequently and deeply discharged. Examples of such applications include micro-hybrid vehicles for instance, those associated with idle-start-stop, power back-up, renewable energy associated with wind or solar and traction, such as used to power electric fork trucks, golf carts or the like.

As lead acid batteries are being used in these deep cycling applications, there is much work underway, especially associated with use in micro-hybrid vehicles to improve fitness for use. To that end, scientist are exploring various options to improve the conductivity and utilization of the active mass, prevent the deleterious effects of sulfation, minimize grid and lug corrosion, and prevent active material shedding, just to mention a few. (See FIG. 16) Even though the lead acid battery has been commercially utilized for over 100 years, advances are still being made.

In accordance with at least certain embodiments or aspects of the present invention, new, improved, high performance, and/or complex performance separators can bring positive impact on extending the functionality of the lead acid battery in these deep cycle applications. As with the larger battery industry, much of the research work has recently focused on developing separators for micro-hybrid vehicles, but we believe many of these advances will also be beneficial to the broader deep cycling market. To provide context, we start with the historic gains made in separator designs and finish with recent work or work that is currently underway.

Figure 18:
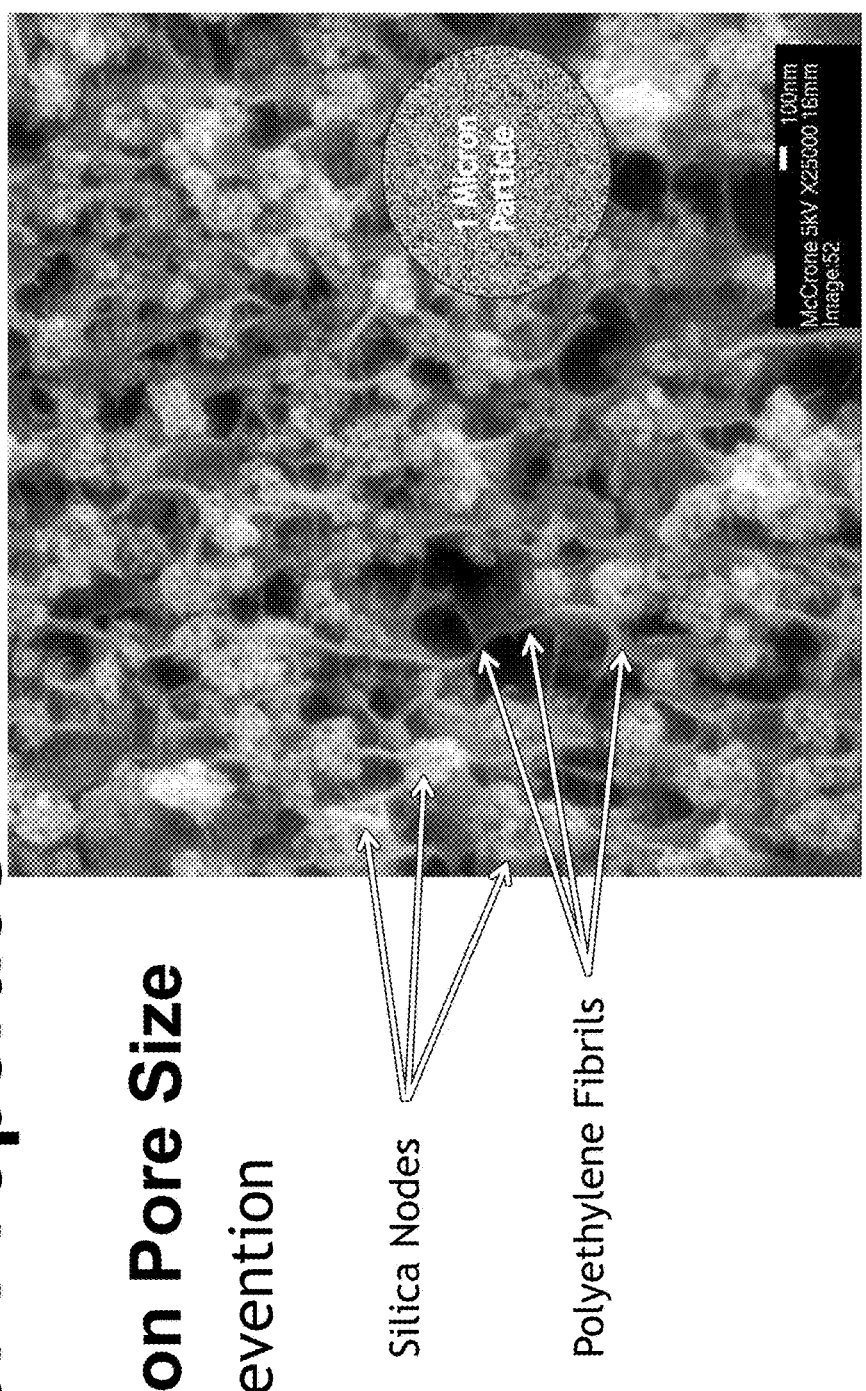

Historically, and with reference to FIG. 17, lead acid batteries used separator constructed of wood shingles, rubber, sintered PVC, and impregnated cellulosic materials. As separators, these materials are in decline throughout the world for a variety of reasons. With reference to FIGS. 18 and 19, we focus on a few properties found in newer separators that ultimately replaced the older technologies: 1) Pore Size distribution, 2) Acid Displacement, 3) Oxidative Resistance and 4) Weld-ability. To understand the importance of pore size of the separator, we first should note that the lead particle used in the active material has an average diameter of 1 to 5 microns. In order to inhibit migration of the lead particle through the separator and thus hindering the formation of points of electronic conductance between electrodes there has been a shift away from the historic separator materials to those with sub-micron pores such as the PE separator. (See FIG. 18).

The next point raised is acid displacement and by this we mean to imply the volume that is occupied by the separator. The more volume the separator occupies, the less acid available between the electrodes. Less separator volume and more acid usually increases battery capacity and often may increase discharge rating, especially when limited by acid volume in the battery. Newer separator materials occupy less volume than their predecessors, and therefore they need to be more oxidative resistant in order to function through the intended life. Simply put, separators that allow for more acid between the plates are typically thinner in backweb thickness and thus need to better withstand oxidative attack.

The last point of historic interest is the ability to be formed into a pocket or sleeve. Often the functional life of a lead acid battery may be cut short due to mossing, side or bottom shorts. By mossing, we mean that active material has shed and formed a conductive bridge around the separator side or bottom, even when there is a mud room present. Separators that can be made into a pocket or a sleeve can greatly reduce or prevent these types of failures.

Figure 20:
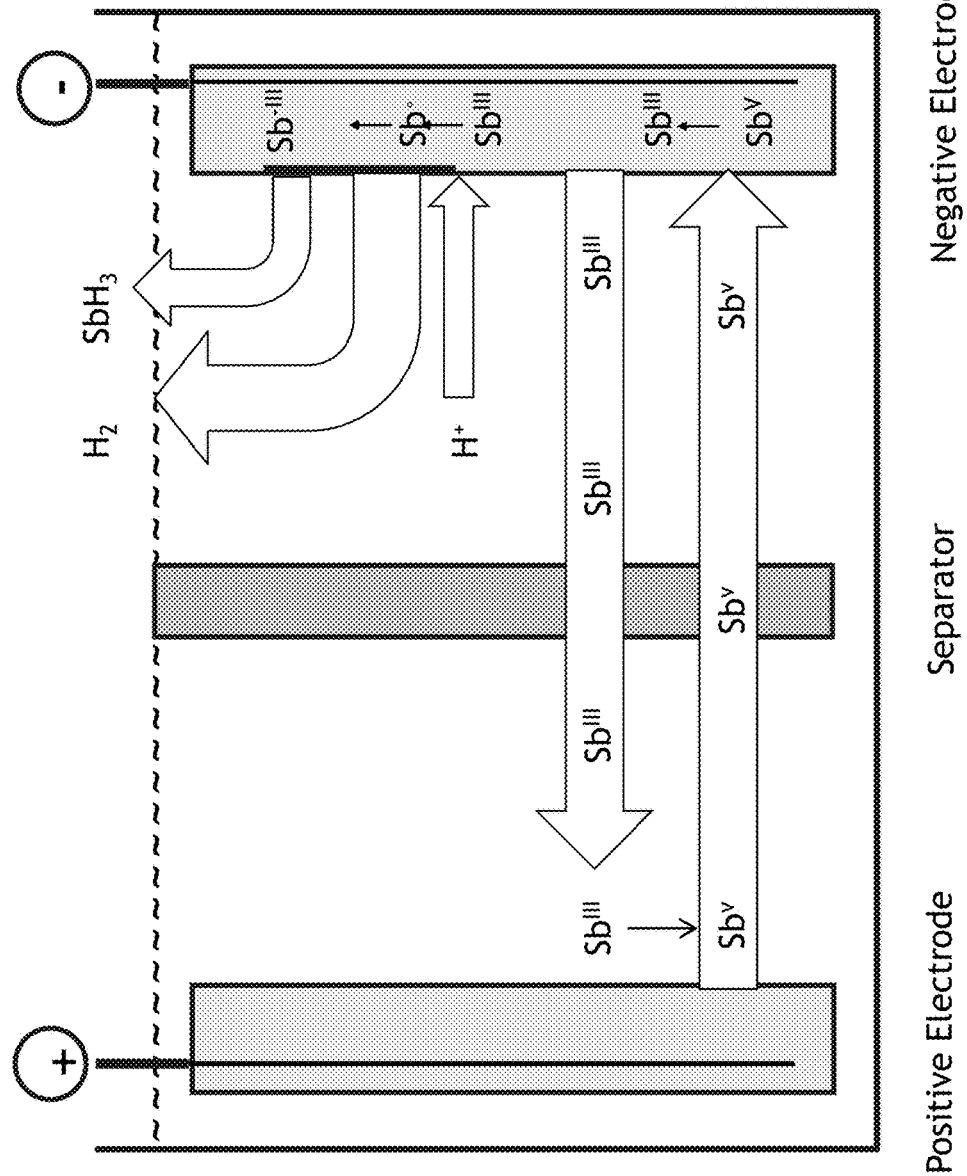

Thus far, we have been speaking of the functionality of the separator in its most basic terms to separate the positive and negative electrodes while allowing the free flow of ions and electrolyte. With reference to FIG. 20, we look at a more active function of the separator and that is suppressing what is often called antimony poisoning. During the life of the battery, a portion of the antimony that is added to the positive grid will become soluble in the electrolyte and then migrate and deposit on the surface of the negative electrode. The plating out of antimony will depolarize the negative electrode and thus put more voltage load on the positive electrode during charging. As the battery is charged, the antimony plated on the negative electrode will initiate the hydrolysis of water before the lead sulfate is converted back to spongy lead. Thus some portion of the charging current is not stored but wasted in producing hydrogen and oxygen from water.

To deal with this antimony issue, battery manufacturers have decreased the concentration of antimony or eliminated it completely. However in deep cycling applications, there are many positive benefits that result from an alloying with antimony. (See FIG. 21) As the battery is deeply discharged, the lead is converted to lead sulfate which is approximately 40% more voluminous and as such will lead to expansion in the cell. Antimony alloys increase the strength of the grid and prevent harmful deformations and which can ultimately assist to convert the lead sulfate back to lead during charging. Next, it has been found through experience that antimony alloys improve the interface between active material and grid. With improved interface, one can expect more efficient use of active material and improved charge acceptance. The most notable reason for antimony is to lower or retard the corrosion rate of the positive grid. Without opening an advanced discussion in the science of metallurgy, antimony alloy is one typical design change to lower grid corrosion especially in batteries that are frequently discharged.

In accordance with at least selected embodiments or aspects of the present invention, battery manufacturers can take advantage of the aforementioned benefits associated with antimony and by selecting the appropriate separator any detrimental impacts can be dealt with. The appropriate or preferred separators are modified, new, improved, and/or complex performance PE separators. PE separators have been used for many years in deep cycling applications such as motive power, inverter batteries, golf cart, and renewable energy and even in SLI applications with stringent OEM specifications for low water loss. Thus when using antimony alloys, it is important to select the appropriate separator to fully utilize the benefits and mitigate any associate deleterious effects.

As stated earlier, many of the scientists associated with the lead acid battery industry have been acutely focused recently to meet the demands associated with the ISS or micro-hybrid vehicles. With reference to FIG. 22, the demands of the ISS or micro-hybrid application are a cross between the high power requirements associated with the SLI battery and the deep cycling demands of the motive power applications.

Figure 23:
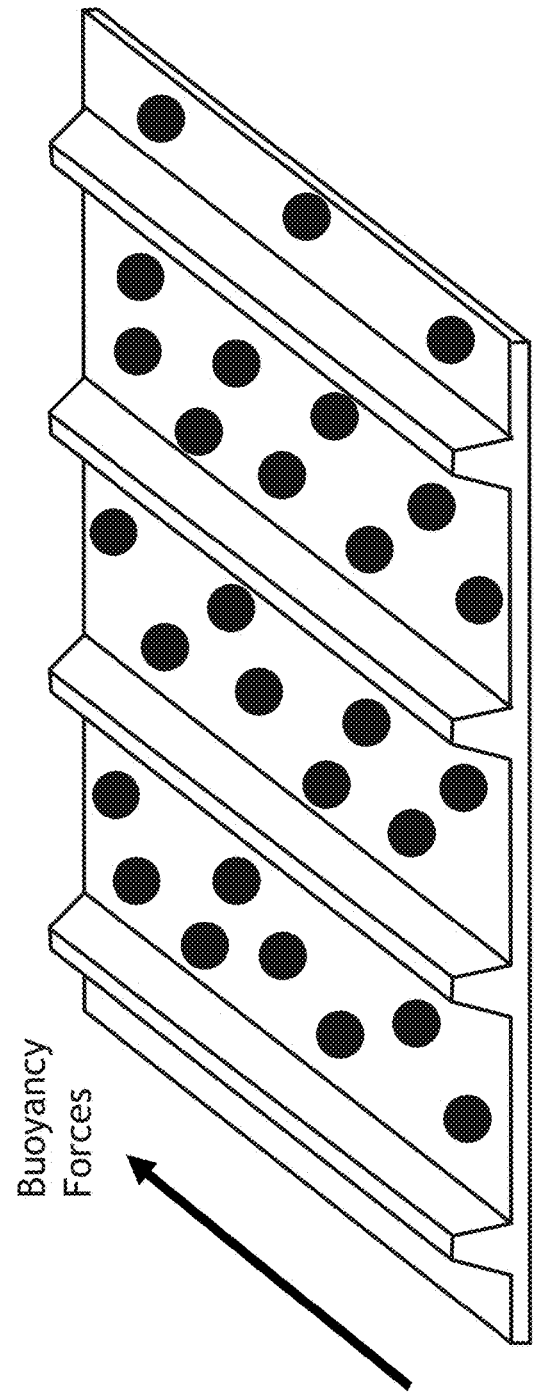

We start with looking at modifications to the separator that can yield more power in the battery. More power can be harvested from the battery as the internal resistance is reduced. By providing more acid between the electrodes limitation associated with diffusion can be solved and also yield more power. Separator resistance is often characterized outside of the battery in a laboratory device. Though the value derived from such a device is generally useful, we think there is an important element missing, namely, gas entrapment. (See FIG. 23) In a flooded lead acid battery gas is generated to varying degrees depending on the charging current. This gas will ultimately escape the battery, but for a time it will adhere to the electrode and separator surfaces. Where the gas is adhered, this is effectively a dead zone for ionic conductance. We have found methods to effectively reduce the amount of gas attached to the separator by approximately 40%. By reducing the gas associated with the separator by preferably 40% or more, a significant improvement in the functional ionic resistance associated with the separator may improve the power performance of the battery.

Another method to improve the power of the battery is to increase the amount of acid between the electrodes. (See FIG. 24) In accordance with at least one embodiment or aspect of the present invention, this is preferably done via stepwise modifications to the separator. First, the oxidation resistance of the separator needs to be improved so that mass of the separator can be reduced without compromising the primary functionality, which is to prevent electronic shorting of the electrodes. With reduced mass, the separator still must have appropriate mechanical properties that allow it to be assembled into a battery. Two such properties are the resistance to puncture and bending stiffness. Once care is taken to improve the oxidation resistance while maintaining appropriate levels of puncture resistance and stiffness, the separator mass can be reduced to increase the volume of electrolyte between the electrodes. With more acid available between the electrodes, the battery is less likely to encounter limitations associated with acid diffusion and thus improve the power output. The table in FIG. 24 shows a comparison between selected standard Daramic® HP and DuraLife® separators, being offered now by Daramic, LLC of Charlotte, N.C. for micro-hybrid battery applications.

In comparing the two separators, we can see that the DuraLife® separator demonstrates a substantial increase in oxidation resistance, while maintaining high puncture resistance that is found in Daramic® HP and this was accomplished with approximately 15% less mass. Less mass of the separator, also means less acid displaced by the DuraLife® separator and thus more acid between the plates. Manufacturers focusing on micro-hybrid applications are finding batteries built with Daramic® DuraLife® separators have lower battery resistance and higher power output during rapid discharge when compared to standard PE separators.

Another major challenge associated with the micro-hybrid application is the ability to extend the cycle life of the battery. Batteries in this application are often operated under a partial state of charge, discharged to varying degrees depending on the duration of time the vehicle is at a stop and the amount of electrical duty during such a stop without being fully recharged between discharges.

Besides delivering a quick boost of power to restart the engine after various stops, the battery may also experience tens of thousands of shallow cycles over the expected life of the battery. As these batteries are cycled there is an opportunity for an acid gradient to develop. (See FIG. 25) With the acid concentrating in the bottom of the cell, the electrochemical reactions will be more limited to the upper portion of the electrode and this will lead to premature capacity loss. In deep cycle applications, sufficient overcharge will create gas bubbles that will assist in mixing the acid and preventing acid stratification. However in applications where the battery is seldom if ever fully charged, such as ISS, other means should be applied to prevent acid stratification.

To employ other means to prevent acid stratification, it is important to first understand the mechanism for why it is created. As electrical current is applied to a battery in a partial state of charge, lead sulfate is converted and a high concentration of sulfuric acid initially forms at the plate surface. At this instant, a boundary layer of sulfuric acid will set-up adjacent to the plate surface. As this acid layer is more concentrated than the bulk acid, there will be a driving force to diffuse or mix with the lower concentrated acid in the bulk space. Beside the forces of diffusion, the forces of gravity will also be active on this boundary layer. Unfortunately, highly concentrated sulfuric acid may be 10 to 20% heavier than the bulk acid and this boundary layer will act like a denser column and result in the acid concentrating the bottom of the cell. This tendency toward acid stratification is especially seen in flooded batteries operated in a partial state of charge where the acid is not immobilized by the separator. Upon charging in a VRLA battery, the concentrated acid produced at the electrode surface immediately comes into contact with the glass fibers that fill the entire space between the electrodes and the capillary action of the intersecting fibers provides a counter force to gravity diminishing the tendency for the acid to stratify.

With the introduction of the DuraLife® separator, there are design changes that we believe help minimize acid stratification in a flooded lead acid battery and in fact battery tests are confirming the positive results. First and foremost, the DuraLife® separator occupies approximately 15% less volume than traditional separators. Thus, between the electrodes more acid will be available which is important to maximize electrical performance. The next design parameter to note is the preferred negative cross rib configuration. (See FIG. 26) Typically, the surface of the separator that is facing the negative electrode is either flat or has mini-ribs in the vertical (or longitudinal) direction. (See FIG. 25)

With reference again to FIG. 26, the preferred negative cross rib design associated with the DuraLife® separator has a multitude of small mini-ribs in the horizontal (or transverse) direction. It is believed that the electrolyte is immobilized to a degree as there are a multitude of small mini-ribs in the horizontal direction. (See FIG. 26) These negative cross ribs provide a mechanical barrier different but synonymous in function with the AGM separator that will hinder the acid gradient from developing. If you like, the negative cross rib design creates upwards of hundreds of mini-transverse dams to keep the heavier acid from flowing downward.

Besides preventing acid stratification, the design of the negative cross rib may also assist in another area. In a rapid discharge, the rate of diffusion of acid into the negative electrode is often a limiting factor when high power is required. Therefore, the negative cross rib design creates hundreds mini dams, which in turns creates hundreds mini pools of acid uniformly across the surface of the electrode. Thus far, we have addressed the possible mechanisms for preventing acid stratification and improving power delivery. The DuraLife® separator has been found to improve power delivery and reduced acid stratification in Micro-hybrid battery testing. With further testing, we will even better understand the various mechanisms and thus further enhance the contributions that the separator can add in these new applications.

Another aspect to extending the life of a deep cycling battery is to inhibit the shedding of the positive active material. To that end, separators are often combined with a non-woven laminate such as a glass mat. (See FIG. 27) The laminate structure is typically applied to the surface of the separator which is in direct contact with the positive electrode. For years this has been a typical commercial approach for extending the functional life of deep cycling batteries. However, the old laminate structure lowered the power output of the battery. In micro-hybrid batteries, the application requires that we simultaneously improve both the cycling ability and the power output.

Thus, work has recently been undertaken to optimize laminate structures for micro-hybrid applications. First, the laminate should maintain the mechanical properties to prevent shedding of the active material over the intended life of the battery. To meet this requirement, the laminate should be constructed with a fiber structure and of materials that are resistant to oxidative attack. Second, the laminate should displace as little acid as possible and thus ensure maximum availability of acid. Displacing as little acid as possible implies that the material is of the lowest basis weight. As the basis weight decreases, the mechanical properties usually also decline. Thus the challenge was and is to optimize the properties simultaneously. There is another challenge created by low basis weight laminates which is the point of bonding of the two materials (separator, laminate). A normal technique for combining the materials is to apply adhesive to the rib surface of the separator and the laminate, but with thinner laminates, the adhesive will often wick to the next layer and create processing problems. Another bonding approach is to sonically weld the laminate structure to the rib top and thus eliminate the adhesive from the system all together. This kind of approach may only be practical when the laminate has a sufficient amount of synthetic fibers in the mat.

There is another laminate criterion that is not inherently obvious but can substantially limit the energy conversion of the battery, namely gas entrapment. Anytime a lead acid battery is overcharged, hydrogen and oxygen are formed due to the hydrolysis of water. In a flooded battery, these gases will ultimately escape. However, for a time, these gases will adhere to the surfaces of the electrodes, separator and especially to the laminate structure incorporated to extend the cycle life of the battery. As the gas is entrapped, the electrolyte is pushed out of the space between the electrodes as demonstrated by the raise in the height of the electrolyte in the battery. As gases are a terrific insulator, the paths of ionic conductance are greatly reduced. Thus optimization of the laminate to minimize gas entrapment is possibly critical for maximizing power and electrical capacity of the lead acid battery either in deep cycle or micro-hybrid applications.

With reference to FIG. 28, a recap is in order. Over the past 100 years lead acid batteries have advanced mostly in an evolutionary manner to the various demands of new applications. To meet these demands, changes have occurred in materials of construction, including the separators. Over this time, separators have migrated toward synthetic materials of construction such as Ultra High Molecular Weight Polyethylene (UHMWPE). These synthetic materials have allowed the separator to be micro-porous for short prevention, improved the oxidation resistance to extend the life, and to be envelope-able so as to prevent side and bottom shorts. These new types of PE separators have offered the potential to add other functionality such as the incorporation of additives into the separator to prevent antimony poisoning and decrease the associated water loss.

To meet new market opportunities such as micro-hybrid, we are sure changes have been and will be required to the materials of construction including the separator. (See FIG. 29) The micro-hybrid application requires high power to crank the engines as is found in traditional SLI batteries and the frequent cycling found in deep discharge batteries. To enhance power, we have preferably changed the separator to increase the available acid and lower the electrical resistance by minimizing the gas entrapment of the separator. To extend battery life, we have preferably immobilized the acid and thus prevented the onset of acid stratification. Next, we added laminates to keep the active material in place. These design changes preferably focus on optimizing three properties of the laminate simultaneously: basis weight, mechanical properties and gas entrapment. Not only have design changes been made and proposed, but at least certain of the separator and laminate changes have also been validated to improve the performance of micro-hybrid flooded batteries.

Meeting the challenges associated with the micro-hybrid application may have benefits in other applications currently served by lead acid batteries. For instance, modifications to the separator to minimize acid stratification, reduced gas entrapment, maximize acid amount, reduce electrical resistance and extend cycle life can all be directly transferrable in current battery applications. These evolutionary changes produced a revolutionary separator, and associated with the inherent favorable cost structure verses competing technologies, make the lead acid battery an excellent choice for the developing ISS and micro-hybrid markets.

In accordance with at least selected embodiments, the preferred new, improved and/or complex performance separator, such as a deep cycle or ISS or micro-hybrid separator, has features that help minimize acid stratification in a flooded lead acid battery, occupies approximately 15% less volume than tradition separators, has negative cross ribs, has a multitude of small mini-ribs in the horizontal direction, has a mechanical barrier that will hinder an acid gradient from developing, has hundreds of mini dams to keep heavier acid from flowing downward, has hundreds of mini dams which create hundreds of mini pools of acid uniformly across the surface of the electrode, that improve power delivery and reduce acid stratification in micro-hybrid batteries, and/or the like.

In accordance with at least selected objects of the present invention, there is provided improved, unique, high performance, and/or complex performance battery separators, lead acid battery separators, flooded lead acid battery separators, enhanced flooded lead acid battery separators, ISS or micro-hybrid battery separators, ISS flooded lead acid battery separators, ISS enhanced flooded lead acid battery separators, batteries including such separators, systems or vehicles including such batteries or separators, methods of production, methods of use, and/or the like.

FIGS. 31 to 34 are directed to leaf or piece type separators. FIG. 31 is a schematic perspective view representation of an exemplary lead acid battery, with parts broken away, illustrating an outward placement of a leaf or piece separator such as the Daramic® Auto PE Leaf Separator or the Daramic® Industrial PE Leaf Separator of FIG. 33. The Daramic® PE Leaf Separators of FIG. 33 are shown with optional glassmat laminate (see the respective enlarged end views).

In accordance with at least selected embodiments, the present invention is directed to new or improved batteries, separators, components, and/or compositions having heavy metal removal capabilities and/or methods of manufacture and/or methods of use thereof. In accordance with at least certain possibly preferred embodiments, the present invention is directed to new or improved lead acid batteries, lead acid battery separators (single or multi-layer), lead acid battery components (such as battery casings, battery parts, porous bags, laminates, coatings, surfaces, fillers, electrode formulations, electrolytes, and/or the like) and/or polymer or resin compositions having heavy metal removal capabilities and/or methods of manufacture and/or methods of use thereof. In accordance with at least possibly more preferred particular embodiments, the present invention is directed to new or improved lead acid batteries, lead acid battery separators (single or multi-layer), lead acid battery components (such as battery casings, battery parts, porous bags, laminates, coatings, surfaces, fillers, electrode formulations, electrolytes, and/or the like) and/or polymer or resin compositions having heavy metal removal capabilities and utilizing at least one PIMS mineral as at least one filler component therein. In accordance with at least one particular microporous lead-acid battery separator embodiment, the PIMS mineral (preferably fish meal, a bio-mineral) is provided as at least a partial substitution for the silica filler component in a silica filled lead acid battery separator (preferably a polyethylene/silica separator formulation). In accordance with at least certain embodiments or examples, the invention is directed to battery separators, to methods of manufacture of battery separators, to methods of use of battery separators, to improved battery separators, and/or to improved separators or laminates for lead acid batteries.

A new or improved lead acid battery may preferably include: a housing containing a positive electrode spaced apart from a negative electrode with a porous separator located between the positive electrode and the negative electrode and an electrolyte in ionic communication between the positive electrode and the negative electrode, and at least one of the housing, separator, positive electrode, negative electrode, and electrolyte include at least one natural or synthetic hydroxyapatite mineral.

A new or improved lead acid battery may preferably include: a housing containing a positive electrode spaced apart from a negative electrode with a porous separator located between the positive electrode and the negative electrode and an electrolyte in ionic communication between the positive electrode and the negative electrode, and at least two of the housing, separator, positive electrode, negative electrode, and electrolyte include at least one natural or synthetic hydroxyapatite mineral.

A new or improved lead acid battery may preferably include: a housing containing a positive electrode spaced apart from a negative electrode with a porous separator located between the positive electrode and the negative electrode and an electrolyte in ionic communication between the positive electrode and the negative electrode, and at least three of the housing, separator, positive electrode, negative electrode, and electrolyte include at least one natural or synthetic hydroxyapatite mineral.

In accordance with at least selected embodiments, the separator includes one or more surfactants. For example, the one or more surfactants may be nonionic, anionic, or cationic, such as:
  Ionic/Anionic:
  Sulfates:
  Alkyl sulfates: ammonium lauryl sulfate, sodium lauryl sulfate.
  Alkyl ether sulfates: sodium laureth sulfate.
  Sulfonates:
  Docusates: dioctyl sodium sulfosuccinate;
  Alkyl benzene sulfonates;
  Phosphates:
  Alkyl aryl ether phosphate
  Alkyl ether phosphate
  Carboxylates:
  Alkyl carboxylates
    Fatty acid salts
    Sodium stearate
    Sodium lauroyl sarcosinate Ionic/Cationic:
Alkyltrimethylammonium
Cetylpyridinium
Polyethoxylated tallow amine
Benzalkonium
Benzethonium
Dimethyldioctadecylammonium
Dioctadecyldimethylammonium
Nonionic:
Fatty alcohols
Cetyl alcohol
Stearyl alcohol
Cetostearyl alcohol
Oleyl alcohol
Polyoxyethylene glycol alkyl ethers
Octaethylene glycol monododecyl ether
Pentaethylene glycol monododecyl ether
Polyoxypropylene glycol alkyl ethers
Glucoside alkyl ethers
Decyl glucoside
Lauryl glucoside
Octyl glucoside
Polyoxyethylene glycol octylphenol ethers
Triton X-100
Polyoxyethylene glycol alkylphenol ethers
Nonoxynol-9
Glycerol alkyl esters
Glyceryl laurate
Polyoxyethylene glycol sorbitan alkyl esters
Polysorbates
Sorbitan alkyl esters
Cocamide
Dodecyldimethylamine oxide
Block copolymers of polyethylene glycol and polypropylene glycol In accordance with at least selected embodiments, the separator includes one or more compounds of the formula R (OR1)n(COOMx+1/x)m. In said formula, R represents a non-aromatic hydrocarbon group comprising between 10 and 4,200 carbon atoms, which can be interrupted by oxygen atoms, R1 represents H, —(CH2)kCOOMx+1/x or —(CH2)k-SO3Mx+1/x, whereby k stands for 1 or 2, M represents an alkali or earth alkaline metal ion, H+ or NH4+, whereby not all variables of M are defined simultaneously as H+, n stands for 0 or 1, m stands for 0 or a whole number from 10 to 1,400 and x stands for 1 or 2. The ratio of oxygen atoms to carbon atoms in the compound according to the aforementioned formula ranges between 1:1.5 and 1:30 and n and m cannot simultaneously represent zero.

The new or improved separators of the present invention may find use as Lead-Acid Battery Separators, separators for use in starting, deep-cycling and stand-by power battery applications, or in Flooded, Gel and AGM battery types used in applications such as: starting, stationary, motive power and deep-cycle lead-acid battery applications, as well as for flooded and specialty lead-acid battery applications, and/or for premium lead-acid gel batteries. Further, such separators may be used in other batteries, accumulators, capacitors, and/or the like.

It is believed that the present invention is the first to recognize the need to address multiple separator properties simultaneously, the first to choose particular multiple separator property combinations, and the first to produce commercially viable multiple property battery separators as described below.

The present invention may be embodied in other forms without departing from the spirit and the essential attributes thereof, and, accordingly, reference should be made to the appended claims, rather than to the foregoing specification, as indicating the scope of the invention.

The invention claimed is:

1. A battery separator for a lead acid battery comprising polyolefin, filler, processing oil, and at least one surfactant, and having an acid leachable total organic carbon (TOC) of less than 100 ppm, an oxidation resistance (Perox @ 40 hours) of >50% of the original CMD elongation, and negative cross ribs, wherein the lead acid battery is an idle start stop (ISS) battery.

2. The battery separator of claim 1, wherein the acid leachable total organic carbon (TOC) is less than 75 ppm.

3. The battery separator of claim 2, wherein the acid leachable total organic carbon (TOC) is less than 50 ppm.

4. The battery separator of claim 1, having at least two of the following properties: a basis weight of from 120 to 154 gsm; backweb thickness in the range of 125 to 250 microns; puncture resistance of >10N; electrical resistance of <10 mohms-in$^2$; a water loss with antimony alloy of <1.5 g/Ah; and a water loss with non-antimony alloy of <0.8 g/Ah.

5. The battery separator of claim 3, having at least two of the following properties: a basis weight of from 120 to 154 gsm; backweb thickness in the range of 125 to 250 microns; puncture resistance of >10N; electrical resistance of <10 mohms-in$^2$; a water loss with antimony alloy of <1.5 g/Ah; and a water loss with non-antimony alloy of <0.8 g/Ah.

6. The battery separator of claim 1, having at least three of the following properties: a basis weight of from 120 to 154 gsm; backweb thickness in the range of 125 to 250 microns; puncture resistance of >10N; electrical resistance of <10 mohms-in$^2$; a water loss with antimony alloy of <1.5 g/Ah; and a water loss with non-antimony alloy of <0.8 g/Ah.

7. The battery separator of claim 1, having at least one of: a stiffness >20 mN and a basis weight of from 120 to 150 gsm.

8. The battery separator of claim 3, having at least one of: a stiffness >20 mN and a basis weight of from 120 to 150 gsm.

9. The battery separator of claim 1, having a stiffness >20 mN and a basis weight of from 120 to 150 gsm.

10. A lead acid battery comprising the separator of claim 1.

11. A lead acid battery comprising the separator of claim 3.

12. A vehicle comprising the lead acid battery of claim 10.

13. A vehicle comprising the lead acid battery of claim 11.

14. A battery separator for a lead acid battery comprising a polyolefin, a filler, a processing oil, and at least one surfactant, wherein the separator has an acid leachable total organic carbon (TOC) of less than 100 ppm, negative cross ribs, an oxidation resistance (Perox @ 40 hours) of >50% of the original CMD elongation, and at least two of the following: a basis weight of from 120 to 154 gsm; backweb thickness in the range of 125 to 250 microns; puncture resistance of >10N; electrical resistance of <10 mohms-in$^2$; a water loss with antimony alloy of <1.5 g/Ah; and a water loss with non-antimony alloy of <0.8 g/Ah, wherein the lead acid battery is an idle start stop (ISS) battery.

15. A battery separator for a lead acid battery comprising: a polyolefin membrane that comprises a polyolefin, a filler, a processing oil, and at least one surfactant, the membrane having an acid leachable total organic carbon (TOC) of less than 100 ppm, negative cross ribs on at least one side of the membrane, an oxidation resistance (Perox @ 40 hours) of >50% of the original CMD elongation, and at least two of the following: a basis weight of from 120 to 154 gsm; backweb thickness in the range of 125 to 250 microns; puncture resistance of >10N; electrical resistance of <10 mohms-in$^2$; a water loss with antimony alloy of <1.5 g/Ah; and a water loss with non-antimony alloy of <0.8 g/Ah, wherein the lead acid battery is an idle start stop (ISS) battery.

16. The battery separator of claim 15, having positive ribs on the other side of the membrane, and said membrane being a polyethylene microporous membrane.

17. A lead acid battery comprising the separator of claim 15.

18. A lead acid battery comprising the separator of claim 16.

19. A vehicle comprising the lead acid battery of claim 17.

20. A vehicle comprising the lead acid battery of claim 18.

21. The battery separator of claim 1, wherein the surfactant comprises an ionic surfactant, a nonionic surfactant, or mixtures thereof.

22. The battery separator of claim 21, wherein the surfactant comprises a nonionic surfactant.

23. The battery separator of claim 21, wherein the surfactant comprises an ionic surfactant.

24. The battery separator of claim 21, wherein the surfactant comprises a mixture of an ionic and a non-ionic surfactant.

25. The battery separator of claim 14, wherein the surfactant comprises an ionic surfactant, a nonionic surfactant, or mixtures thereof.

26. The battery separator of claim 15, wherein the surfactant comprises an ionic surfactant, a nonionic surfactant, or mixtures thereof.

27. The battery separator of claim 1 wherein the filler is silica.

28. The battery separator of claim 14 wherein the filler is silica.

29. The battery separator of claim 15 wherein the filler is silica.

30. A lead acid battery comprising a battery separator comprising polyolefin, a filler, processing oil, and at least one surfactant, and having an acid leachable total organic carbon (TOC) of less than 100 ppm, an oxidation resistance (Perox @ 40 hours) of >50% of the original CMD elongation, and negative cross ribs, wherein the lead acid battery is an idle start stop (ISS) battery.

31. The lead acid battery of claim 30 wherein the filler is silica.

32. A lead acid battery comprising a battery separator which comprises a polyolefin, a filler, a processing oil, and at least one surfactant, wherein the separator has an acid leachable total organic carbon (TOC) of less than 100 ppm, negative cross ribs, an oxidation resistance (Perox @ 40 hours) of >50% of the original CMD elongation, and at least two of the following: a basis weight of from 120 to 150 gsm; backweb thickness in the range of 125 to 250 microns; puncture resistance of >10N; electrical resistance of <10 mohms-in$^2$; a water loss with antimony alloy of <1.5 g/Ah; and a water loss with non-antimony alloy of <0.8 g/Ah, wherein the lead acid battery is an idle start stop (ISS) battery.

33. The lead acid battery of claim 32 wherein the filler is silica.

34. A lead acid battery comprising a battery separator which comprises a polyolefin membrane that comprises a polyolefin, a filler, a processing oil, and at least one surfactant, the membrane having an acid leachable total organic carbon (TOC) of less than 100 ppm, negative cross ribs on at least one side of the membrane, an oxidation resistance (Perox @ 40 hours) of >50% of the original CMD elongation, and at least two of the following: a basis weight of from 120 to 154 gsm; backweb thickness in the range of 125 to 250 microns; puncture resistance of >10N; electrical resistance of <10 mohms-in$^2$; a water loss with antimony alloy of <1.5 g/Ah; and a water loss with non-antimony alloy of <0.8 g/Ah, wherein the lead acid battery is an idle start stop (ISS) battery.

35. The lead acid battery of claim 34 wherein the filler is silica.

* * * * *